US012750724B2

(12) United States Patent
Langer et al.

(10) Patent No.: US 12,750,724 B2
(45) Date of Patent: Sep. 29, 2026

(54) QUALITY OF SERVICE PRESERVATION IN PRIVATE NETWORKS

(71) Applicant: Boost SubscriberCo L.L.C., Englewood, CO (US)

(72) Inventors: Paul Langer, Englewood, CO (US); In-Kyung Kim, Englewood, CO (US)

(73) Assignee: BOOST SUBSCRIBERCO L.L.C., Englewood, CO (US)

( * ) Notice: Subject to any disclaimer, the term of this patent is extended or adjusted under 35 U.S.C. 154(b) by 261 days.

(21) Appl. No.: 18/753,964

(22) Filed: Jun. 25, 2024

(65) Prior Publication Data

US 2025/0220496 A1 Jul. 3, 2025

Related U.S. Application Data

(60) Provisional application No. 63/615,723, filed on Dec. 28, 2023.

(51) Int. Cl.
*H04W 28/02* (2009.01)
*H04W 88/10* (2009.01)

(52) U.S. Cl.
CPC ... *H04W 28/0268* (2013.01); *H04W 28/0231* (2013.01); *H04W 88/10* (2013.01)

(58) Field of Classification Search
CPC ......... H04W 28/0231; H04W 28/0268; H04W 88/10
See application file for complete search history.

(56) References Cited

U.S. PATENT DOCUMENTS

| | | | | |
|---|---|---|---|---|
| 10,757,419 | B2 * | 8/2020 | Kottke | H04N 19/154 |
| 12,063,260 | B2 * | 8/2024 | Chen | H04L 65/80 |
| 2012/0140619 | A1 * | 6/2012 | Chen | H04W 4/06 370/229 |
| 2012/0243462 | A1 * | 9/2012 | Bucknell | H04B 7/155 370/315 |
| 2015/0009930 | A1 * | 1/2015 | Rapaport | H04W 72/542 370/329 |
| 2015/0229970 | A1 * | 8/2015 | Ma | H04L 65/762 370/328 |
| 2021/0344735 | A1 * | 11/2021 | Ke | H04L 47/2491 |
| 2024/0323748 | A1 * | 9/2024 | Altman | H04W 28/0268 |

* cited by examiner

*Primary Examiner* — Kashif Siddiqui
(74) *Attorney, Agent, or Firm* — Seed Intellectual Property Law Group LLP

(57) ABSTRACT

Disclosed is a method performed by an access point device in a private network. The method includes obtaining a first quality of service (QoS) class identifier (QCI) and a first for first streams transmitted using a first communications protocol, obtaining a second QCI and a second bitrate for second streams transmitted using a second communications protocol, obtaining a third QCI based on the first QCI and a first QCI margin increment, obtaining a third bitrate based on the first bitrate and a first bitrate margin increment, obtaining a fourth QCI based on the second QCI and a second QCI margin increment, obtaining a fourth bitrate based on the first bitrate and a first bitrate margin increment, and transmitting the first and second streams using a communication link configured based on the third QCI, the third bitrate, the fourth QCI, and the fourth bitrate.

20 Claims, 10 Drawing Sheets

QUALITY OF SERVICE PRESERVATION IN PRIVATE NETWORKS

BACKGROUND

A private network can be formed using a set of nodes that provide fifth-generation (5G) New Radio (NR) functionality. Each connection between nodes is a separate 5G link. Each 5G link terminates in a radio, and a stream is forwarded to a next radio, if needed. In such private networks, either a User Equipment (UE) device or device in a Core network will set Quality of Service (QoS) or QoS Class Identifier (QCI) parameter(s) for each stream transmitted by the UE device or the Core network.

As streams "hop" from node to node, from an endpoint to the Core network, each stream gets its own QCI/QoS parameter(s). There is a need to ensure that the overall end-to-end link preserves QCI/QoS and bitrate to a final UE device. As multiple independent streams are created, each independent streams requires independent quality parameter (s). Even with a high bitrate and low latency dedicated link, for example, using the n96 5G NR band, issue arises in arbitrating multiple independent streams.

BRIEF SUMMARY

The present disclosure teaches methods, systems, devices, and computer-readable media that enable cascading QCI/QoS parameter(s) end-to-end, to ensure proper quality of service. According to the present disclosure, multiple streams of differing QCI/QoS and bitrates can be managed, and management of streams can be optimized to maintain highest throughput.

Such QoS/QCI parameters may include, for example, a 5G QoS Identifier (5QI), an Allocation and Retention Priority (ARP), a Guaranteed Flow Bit Rate (GFBR), a Maximum Flow Bit Rate (MFBR), a Packet Delay Budget (PDB), a Packet Error Rate (PER), a QoS Flow Identifier (QFI), and a Reflective QoS Attribute (RQA). Each 5QI may be associated with a Resource type (Guaranteed Bit Rate (GBR), non-GBR, or delay critical GBR), a Default Priority Level, a Packet Delay Budget (PDB) that defines an upper bound for the time that a packet may be delayed between a UE device and a User Plane Function (UPF), Packer Error Rate (PER), Default Maximum Data Burst Volume, and a Default Averaging Window. Also, types of QoS flows may correspond to different QoS characteristics based on latency, priority, and data rate. For example, types of QoS flows may include QoS flow with GBR, QoS flow with NGBR, delay critical GBR, and reflective QoS. Each Service Data Flow (SDF) is associated with one QoS Class Identifier (QCI). For the same IP-Connectivity Access Network (IP-CAN) session multiple SDFs with the same QCI and ARP can be treated as a single traffic aggregate which is referred to as an SDF aggregate.

A method performed by a primary access point device in a private network according to the present disclosure may be characterized as including: obtaining a first quality of service (QoS) class identifier (QCI) and a first bitrate based on one or more first stream requests received by the primary access point device or a secondary access point device, the one or more first stream requests corresponding to one or more first streams transmitted using a first communications protocol; obtaining a second QCI and a second bitrate based on one or more second stream requests received by the primary access point device or the secondary access point device, the one or more second stream requests corresponding to one or more second streams transmitted using a second communications protocol, the second communications protocol being different from the first communications protocol; obtaining a third QCI based on the first QCI and a first QCI margin increment; obtaining a third bitrate based on the first bitrate and a first bitrate margin increment; obtaining a fourth QCI based on the second QCI and a second QCI margin increment; obtaining a fourth bitrate based on the second bitrate and a second bitrate margin increment; and transmitting the one or more first streams and the one or more second streams using a communication link between the primary access point and the secondary access point device, the communication link being configured based on the third QCI, the third bitrate, the fourth QCI, and the fourth bitrate.

The obtaining the second QCI may include: obtaining QoS information based on a plurality of second stream requests corresponding to the one or more second streams transmitted using the second communication protocol; and converting the QoS information to the second QCI.

The first communications protocol may be a cellular communications protocol, and the second communications protocol may be a wireless local area network protocol.

The method may further include: obtaining a fifth QCI and a fifth bitrate based on one or more third stream requests received by the primary access point device or the secondary access point device, the one or more third stream requests corresponding to one or more third streams transmitted using the first communications protocol; obtaining a sixth QCI and a sixth bitrate based on one or more fourth stream requests received by the primary access point device or the secondary access point device, the one or more third stream requests corresponding to one or more fourth streams transmitted using the second communications protocol; obtaining a seventh QCI based on the fifth QCI and the first QCI margin increment; obtaining a seventh bitrate based on the fifth bitrate and the first bitrate margin increment; obtaining an eighth QCI based on the sixth QCI and a second QCI margin increment; obtaining an eighth bitrate based on the sixth bitrate and the second bitrate margin increment; and transmitting the one or more third streams and the one or more fourth streams using the communication link between the primary access point and the secondary access point device, the communication link being configured based on the seventh QCI, the seventh bitrate, the eighth QCI, and the eighth bitrate.

The obtaining the first QCI may include obtaining a first default QoS or QCI value based on contents of one of a plurality of first stream requests, or the obtaining the second QCI may include obtaining a second default QoS or QCI value based on contents of one of a plurality of second stream requests.

The method may further include: configuring the communication link based on the third QCI, the third bitrate, the fourth QCI, and the fourth bitrate, including transmitting a message from the primary access point device to the secondary access point device, the message indicating one or more carrier frequencies and one or more bandwidths respectively corresponding to the one or more carrier frequencies.

The method may further include: configuring the communication link based on the third QCI, the third bitrate, the fourth QCI, and the fourth bitrate; and reconfiguring the communication link in response to determining that a current time corresponds to a scheduled time.

The obtaining the first QCI may be based on a type of stream indicated by of one of a plurality of first stream requests, a type of a device that transmitted one of a plurality of first stream requests, or a capability of the device that transmitted one of the plurality of first stream requests, or the obtaining the second QCI may be based on a type of stream indicated by of one of a plurality of second stream requests, a type of a device that transmitted one of the plurality of second stream requests, or a capability of the device that transmitted one of the plurality of second stream requests.

The third QCI may be greater than the first QCI, the third bitrate may be greater than the first bitrate, the fourth QCI may be greater than the second QCI;

wherein the fourth bitrate is greater than the second bitrate.

A method performed in a core network that communicates with a private network according to the present disclosure may be characterized as including: receiving, from a primary access point device of the private network, a first quality of service (QoS) parameter identifier (QCI) and a first bitrate corresponding to one or more first streams transmitted using a first communications protocol; receiving, from the primary access point device of the private network, a second QCI and a second bitrate corresponding to one or more second streams transmitted using a second communications protocol, the second communications protocol being different from the first communications protocol; receiving, from a secondary access point device of the private network, a third QCI and a third bitrate corresponding to one or more third streams transmitted using the first communications protocol; receiving, from the secondary access point device of the private network, a fourth QCI and a fourth bitrate corresponding to one or more fourth streams transmitted using the second communications protocol; and configuring a communication link between the primary access point device and the secondary access point device of the private network based on the first QCI, the first bitrate, the second QCI, the second bitrate, the third QCI, the third bitrate, the fourth QCI, and the fourth bitrate.

The method may further include: receiving, from the primary access point device of the private network, a first performance metric corresponding to the one or more first streams transmitted using the first communications protocol; receiving, from the primary access point device of the private network, a second performance metric corresponding to the one or more second streams transmitted using the second communications protocol; receiving, from the secondary access point device of the private network, a third performance metric corresponding to the one or more third streams transmitted using the first communications protocol; receiving, from the secondary access point device of the private network, a fourth performance metric corresponding to the one or more fourth streams transmitted using the second communications protocol; and reconfiguring the communication link between the primary access point device and the secondary access point device of the private network based on the first performance metric, the second performance metric, the third performance metric, and the fourth performance metric.

The method may further include: receiving, from the primary access point device of the private network, a first performance metric corresponding to the one or more first streams transmitted using the first communications protocol; receiving, from the primary access point device of the private network, a second performance metric corresponding to the one or more second streams transmitted using the second communications protocol; receiving, from the secondary access point device of the private network, a third performance metric corresponding to the one or more third streams transmitted using the first communications protocol; receiving, from the secondary access point device of the private network, a fourth performance metric corresponding to the one or more fourth streams transmitted using the second communications protocol; and transmitting the first performance metric, the second performance metric, the second performance metric, the third performance metric, and the fourth performance metric.

The method may further include: receiving, from a user equipment (UE) device connected to the primary access point device or the secondary access point device of the private network, a first performance metric corresponding to the one or more first streams transmitted using the first communications protocol; receiving, from the UE device connected to the primary access point device or the secondary access point device of the private network, a second performance metric corresponding to the one or more second streams transmitted using the second communications protocol; and reconfiguring the communication link between the primary access point device and the secondary access point device of the private network based on the first performance metric and the second performance metric.

The method may further include: receiving, from the primary access point device of the private network, a unique identifier of the primary access point device of the private network; receiving, from the secondary access point device of the private network, a unique identifier of the secondary access point device of the private network; storing a first performance parameter corresponding to the one or more first streams transmitted using the first communications protocol in association with the unique identifier of the primary access point device of the private network; storing a second performance parameter corresponding to the one or more second streams transmitted using the first communications protocol in association with the unique identifier of the primary access point device of the private network; storing a third performance parameter corresponding to the one or more first streams transmitted using the first communications protocol in association with the unique identifier of the secondary access point device of the private network; and storing a fourth performance parameter corresponding to the one or more second streams transmitted using the second communications protocol in association with the unique identifier of the primary access point device of the private network.

The method may further include: receiving, from the primary access point device of the private network, a unique identifier of the primary access point device of the private network; receiving, from the secondary access point device of the private network, a unique identifier of the secondary access point device of the private network; transmitting, to the primary access point device of the private network, a request for first performance information; receiving, from the primary access point device of the private network, the first performance information; storing the first performance information in association with the unique identifier of the primary access point device of the private network; transmitting, to the secondary access point device of the private network, a request for second performance information; receiving, from the secondary access point device of the private network, the second performance information; and storing the second performance information in association with the unique identifier of the secondary access point device of the private network.

The method may further include: receiving, from a user equipment (UE) device connected to the primary access point device or the secondary access point device of the private network, a unique identifier of the UE device; storing a first performance parameter corresponding to the one or more first streams transmitted using the first communications protocol in association with the unique identifier of the UE device; and storing a second performance parameter corresponding to the one or more second streams transmitted using the first communications protocol in association with the unique identifier of the UE device.

The method may further include: receiving, from a user equipment (UE) device connected to the primary access point device or the secondary access point device of the private network, a unique identifier of the UE device; transmitting, to the UE device, a request for performance information; receiving, from the UE device, the performance information; and storing the performance information in association with the unique identifier of the UE device.

The first communications protocol may be a cellular communications protocol, and the second communications protocol may be a wireless local area network protocol.

The method may further include: receiving, from the primary access point device of the private network, a fifth QCI and a fifth bitrate corresponding to one or more fifth streams transmitted using the first communications protocol; receiving, from the primary access point device of the private network, a sixth QCI and a sixth bitrate corresponding to one or more sixth streams transmitted using the second communications protocol; receiving, from the secondary access point device of the private network, a seventh QCI and a seventh bitrate corresponding to one or more seventh streams transmitted using the first communications protocol; receiving, from the secondary access point device of the private network, an eighth QCI and an eighth bitrate corresponding to one or more eighth streams transmitted using the second communications protocol; and reconfiguring the communication link between the primary access point device and the secondary access point device of the private network based on the fifth QCI, the fifth bitrate, the sixth QCI, the sixth bitrate, the seventh QCI, and the seventh bitrate.

The method may further include: configuring a communication link between the secondary access point device and an access of the private network that is different from the primary access point device in response to determining that stream requirements of the primary access point device is greater than a first threshold value or in response to determining that stream requirements of the primary access point device is less than a second threshold value.

BRIEF DESCRIPTION OF THE SEVERAL VIEWS OF THE DRAWINGS

Non-limiting and non-exhaustive embodiments are described with reference to the following drawings. In the drawings, like reference numerals refer to like parts throughout the various figures unless otherwise specified.

For a better understanding of the present disclosure, reference will be made to the following Detailed Description, which is to be read in association with the accompanying drawings.

DETAILED DESCRIPTION

The present disclosure teaches access point (AP) devices that interoperate to provide a private network, which can communicate with a core network (e.g., a fourth-generation Long Term Evolution (4G LTE) network core or a fifth-generation New Radio (5G NR) network core). The AP devices utilize a control channel, which is transmitted over a wireless backhaul connection (e.g., using an unlicensed frequency band n96, 6 GHz), to exchange messages that are used to discover other AP devices and devices attached thereto (e.g., UE devices), and to determine how to route traffic within the private network using other frequency bands, which may be licensed or unlicensed.

Figure 1:
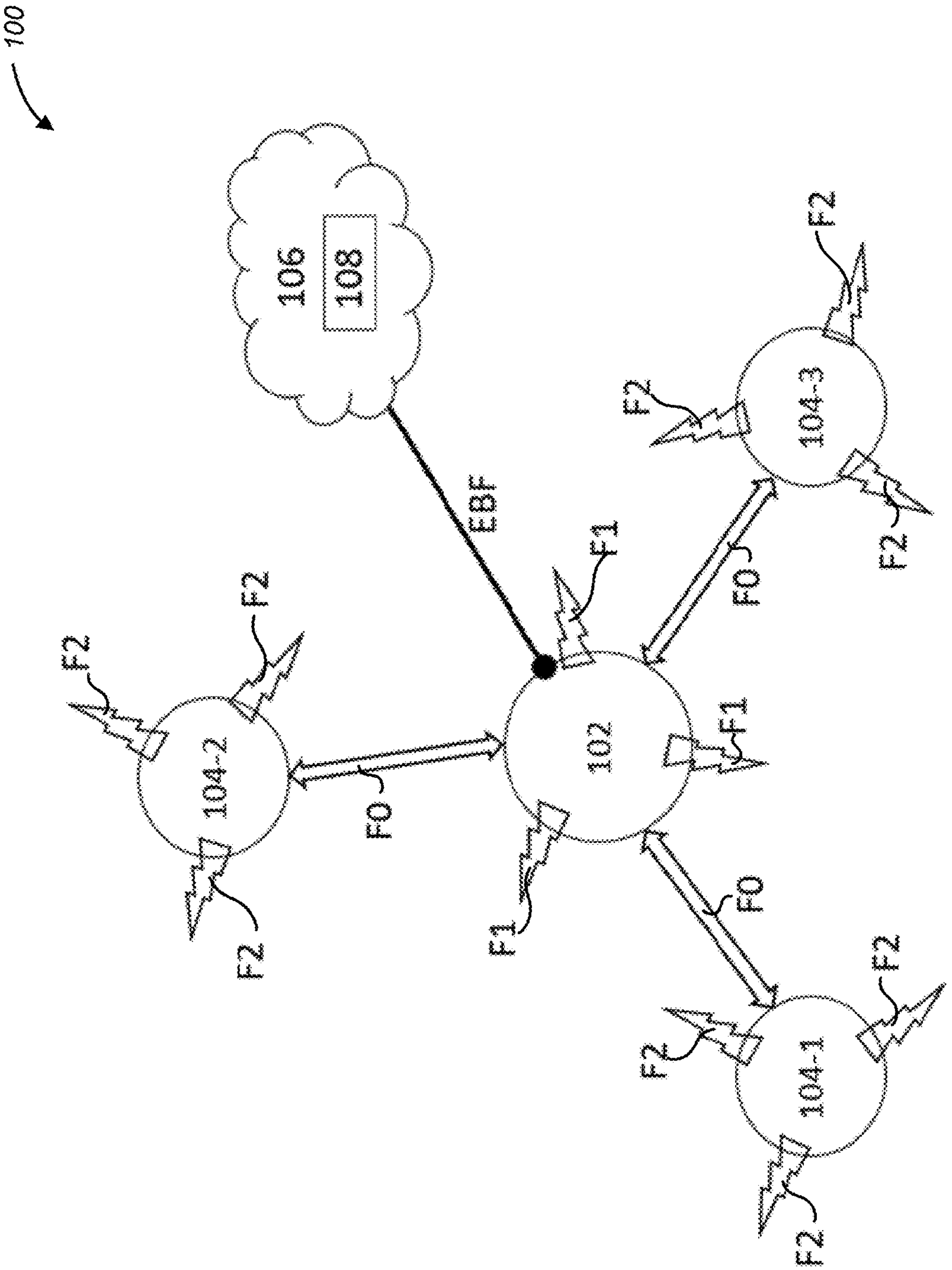
FIG. 1 is a diagram of a private network in accordance with embodiments described herein.

FIG. 1 is a diagram of a private network 100 in accordance with embodiments described herein. The private network 100 is provided by a plurality of access point devices, including a primary access point and one or more secondary access point devices. In the example shown in FIG. 1, the private network 100 includes primary access point device 102, and three secondary access point devices 104-1, 104-2, and 104-3. Each of the access point devices 102, 104-1, 104-2, and 104-3 communicates using several different frequency bands. Some of the frequency bands may be unlicensed and some may be licensed.

The primary access point device 102 communicates wirelessly using a set of one or more frequencies included in a first frequency band F0 (e.g., 5G New Radio Unlicensed (5GNRU) band n96) for wireless backhaul connections with the secondary access point devices 104-1, 104-2, and 104-3. Also, the primary access point device 102 communicates wirelessly using a set of one or more frequencies included in a second frequency band F1 (e.g., 5G New Radio (5GNR) access frequency on a mid-band of 3.5 GHz) for wireless connections with client devices, such as user equipment (UE) devices (not shown). In addition, the primary access point device 102 communicates in wired manner (e.g., using an optical fiber connection) to an Internet Service Provider (ISP) for external backhaul feed (EBF). The primary access point device 102 uses the first frequency band F0 for gNB access supporting backhaul communications for the secondary access point devices 104-1, 104-2, and 104-3. The second frequency band F1 is used for gNB access supporting user traffic. The second frequency band F1 may include frequencies bands n48 GAA or CA-n77_n48 PAL (optionally carrier aggregation (CA) with band n96).

In one or more implementations, the primary access point device 102 has the following gNB access capabilities: simultaneous operation on two frequencies (n96 and 3.5 MHz), 2 bands on 3.5 GHz with inter-band CA (n77 and n48), and 4×4 Transmit/Receive (Tx/Rx) on 100 MHz bandwidth (BW) for each frequency.

The primary access point device 102 operates as a base station (e.g., gNB) that provides connectivity between client device (not shown) (e.g., UE devices attached to the primary access point device 102 and the secondary access point devices 104-1, 104-2, and 104-3) and a core network (5G Core 5GC) or an Evolved Packet Core (EPC) 106 via the EBF. The primary access point device 102 is responsible for radio-related functions in the private network 100, for example, radio resource management, admission control, connection establishment, routing of user-plane data to the UPF and control-plane information to an access and mobility management function (AMF), and quality-of-service (QoS) flow management. The Core network (5GC or EPC) 106 includes a server device 108 that performs various network functions that enable the private network 100 to operate, for example, configuring control channels between the primary access point device 102 and each of the secondary access point devices 104-1, 104-2, and 104-3.

In one or more implementations, the secondary access point devices 104-1, 104-2, and 104-3 communicate wirelessly with the primary access point device 102 using a set of one or more frequencies included in the first frequency band F0 (e.g., 5GNRU band n96) for wireless backhaul connections with the primary access point device 102. In addition, the secondary access point devices 104-1, 104-2, and 104-3 communicate wirelessly with client devices (e.g., UE devices) using a set of one or more frequencies included in a third frequency band F2 (e.g., 5GNR access frequency on the mid-band of 3.5 GHz). For example, the secondary access point devices 104-1, 104-2, and 104-3 receive user data from client devices using a set of one or more frequencies included in the third frequency band F2, and forward the user data using a set of one or more frequencies included in the first frequency band F0 to the primary access point device 102, which may forward the user data to the Core network (5GC or EPC) 106 using the external backhaul feed (EBF).

In one or more implementations, the secondary access point devices 104-1, 104-2, and 104-3 have the following gNB and UE access capabilities: gNB: inter-band CA on 3.5 GHz (n77 and n48), UE: n96, and 4×4 Tx/Rx on 100 MHz BW for each frequency. UE access capabilities are enabled by radio devices internal to the secondary access point devices 104-1, 104-2, and 104-3 to support link connection to the primary access point device 102. That is, the secondary access point devices 104-1, 104-2, and 104-3 include a UE type of function. A UE device that connects to the secondary access point devices 104-1, 104-2, and 104-3 must support n48, n77, n96 (but may not support full 4×4, 100 MHz per power/cost/heat) just as in connecting to the primary access point device 102.

In use, when the private network 100 is set up at a location, such as a building, for example, there is only one backhaul feed (e.g., Internet connection) to the building. The primary access point device 102 is installed in the building and connected to the Internet. Coverage of the primary access point device 102 can be extended by adding one or more of the secondary access point devices 104-1, 104-2, and 104-3. Each of the one or more of the secondary access point devices 104-1, 104-2, and 104-3 is connected to the primary access point device 102 using a 5GNRU link, i.e., n96. Accordingly, each of the one or more of the secondary access point devices 104-1, 104-2, and 104-3 requires only electrical power for operation. Each of the one or more of the secondary access point devices 104-1, 104-2, and 104-3 has a direct connection to the primary access point device 102. Although, the private network 100 shown in FIG. 1 includes three secondary access point devices 104-1, 104-2, and 104-3, the private network 100 may include a different number of secondary access point devices, such as only one secondary access point device, for example, the secondary access point device 104-1. If multiple secondary access point devices are used, the total traffic capacity delivered from the secondary access point devices is limited by the n96 backhaul capacity. The primary access point device 102 provides 5GNR and WiFi coverage. The primary access point device 102 can be configured such that the WiFi radio frequency (RF) is the same as 5GNR RF coverage, which obviates a need for an additional WiFi only access point.

In one or more implementations, the primary access point device 102 is connected to a Global Positioning Device (GPS) device (e.g., by a cable), and the primary access point device 102 obtains timing information based on a signal output by the GPS device. The secondary access point devices 104-1, 104-2, and 104-3 may not be connected to a GPS device. Accordingly, the secondary access point devices 104-1, 104-2, and 104-3 obtain timing information from the primary access point device 102 using the backhaul communications using the first frequency band F0 (e.g., 5G New Radio Unlicensed (5GNRU) band n96) and perform synchronization using the timing information. For example, the primary access point device 102 and the secondary access point devices 104-1, 104-2, and 104-3 are configured to implement the Precision Time Protocol (PTP) as defined in IEEE 1588-2008 standard, for example, using Frequency Division Duplex (FDD) communications. After the primary access point device 102 and the secondary access point devices 104-1, 104-2, and 104-3 synchronize their respective clocks that can efficiently perform Time Division Duplex (TDD) communications.

Assuming that 5GNR offers equivalent or better services than WiFi, peak throughput is greater than 1 Gbps, which may require 5GNR access BW of approximately 100 MHz, and a separate BW allocation for the backhaul that is greater than 100 MHz. Downlink peak throughput for TDD band (256QAM, 30 KHz Subcarrier Spacing (SCS)) may be provided as show in Table 1 below.

TABLE 1

| BW | DDDDDDDSUU (70%) | DDDSU (60%) |
|---|---|---|
| 100 MHz | 1.6 Gbps | 1.4 Gbps |
| 80 MHz | 1.3 Gbps | 1.1 Gbps |

In Table 1, the letter “D” indicates a time period used for downlink communications, the letter “S” indicates a time period used for switching communication directions, and the letter “U” indicates a time period used for uplink communications.

In a typical installation, 5GNR coverage is larger than WiFi AP. However, it is desirable to make WiFi AP coverage same as 5GNR in a configuration where the AP supports both 5GNR and WiFi access (e.g., secondary access point device 104-1 in FIG. 3). If this is done, the total number of APs will be reduced by a factor K. The factor K can be considered as a cost saving factor, which may be between 2 and 4.

In one or more implementations, the primary access point device 102 provides gNB functionality using 2×4T4R on 100 MHz BW (with inter-band CA capability). Each of the secondary access point devices 104-1, 104-2, and 104-3 provides gNB functionality (access) using 1×4T4R on 100 MHz BW (with inter-band CA capability), and provides UE capability (e.g., radio links used by the secondary access point devices 104-1, 104-2, and 104-3 or backhaul) using 1×4T4R on 100 MHz BW. The secondary access point devices 104-1, 104-2, and 104-3 provide UE support using NRU band (n96) and 3.5 GHz (n77 and n48).

Figure 4A:
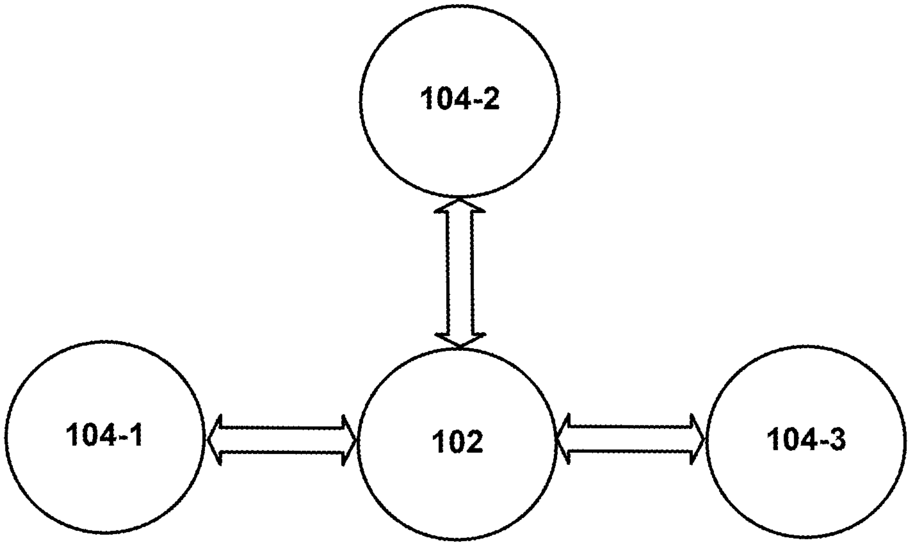
FIGS. 4A, 4B, and 4C are diagrams of example private network systems in accordance with embodiments described herein.
Figure 4B:
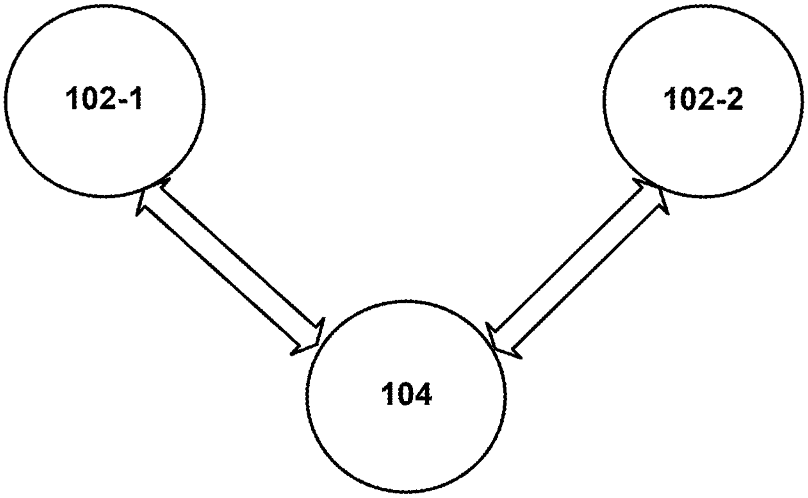
Figure 4C:
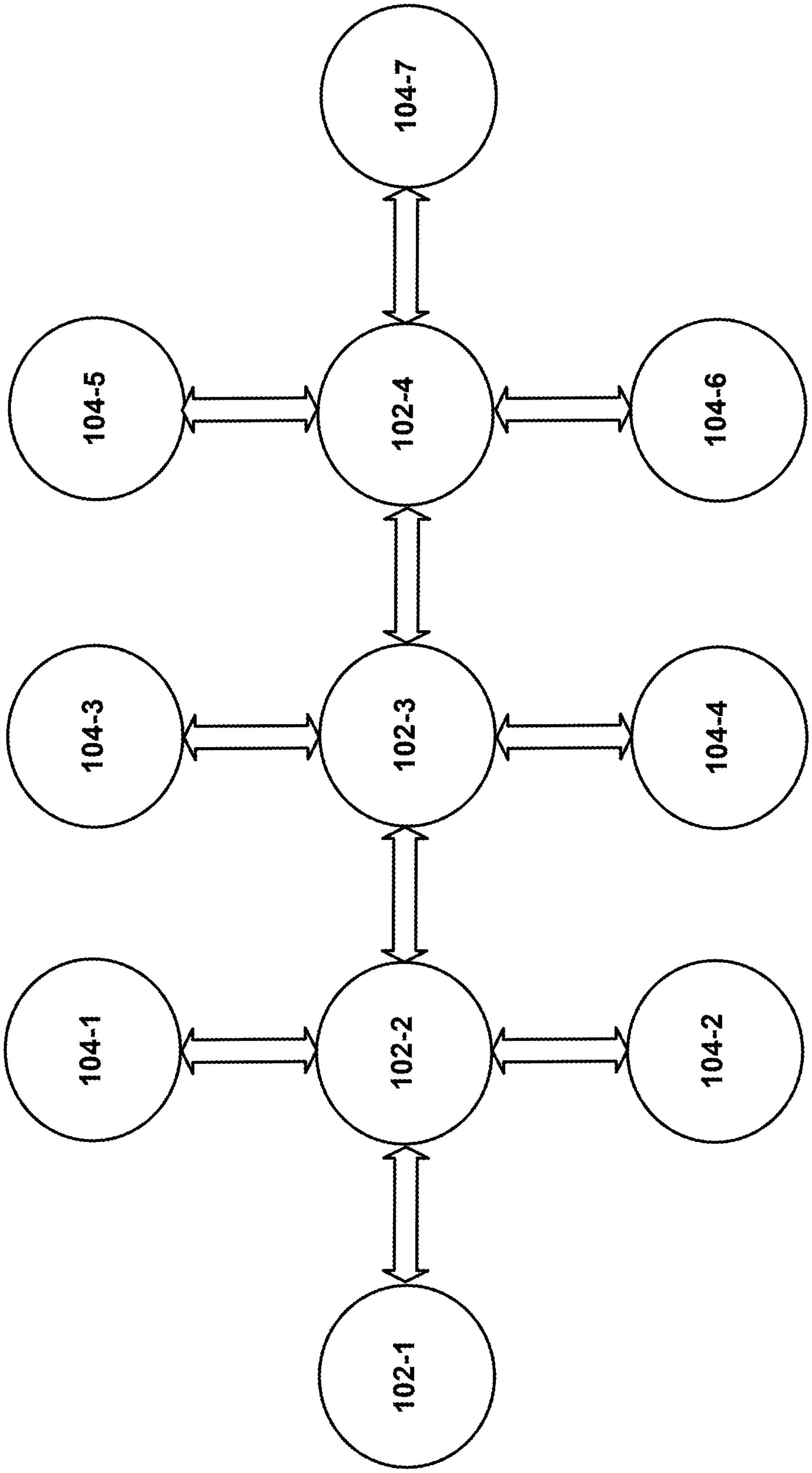
Figure 5:
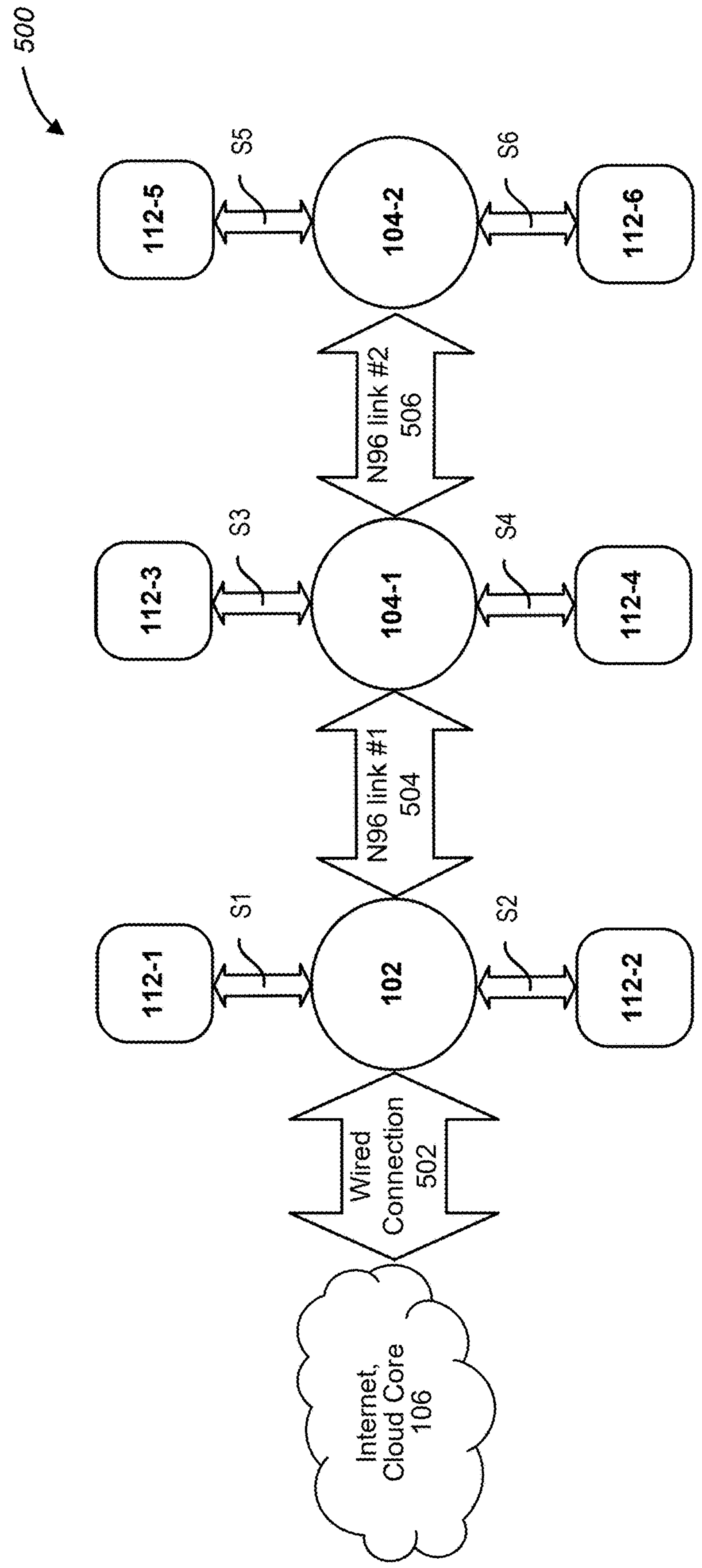
FIG. 5 is a diagram showing a portion of a private network in accordance with embodiments described herein.

In one or more implementations, the primary access point device 102 and the secondary access point devices 104-1, 104-2, and 104-3 are configured and operated as described and shown in FIGS. 4 and 5 of U.S. patent application Ser. No. 17,859,986, entitled "Private Network", filed Jul. 7, 2022, which is hereby incorporated by reference in its entirety.

Figure 2A:
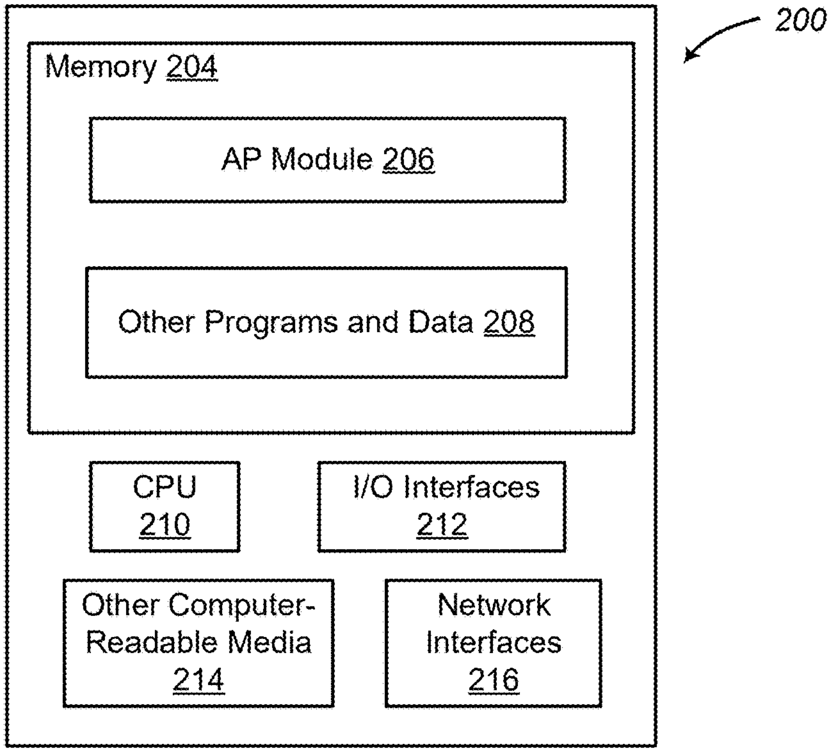
FIG. 2A is a block diagram illustrating an example of an access point device in accordance with embodiments described herein.

FIG. 2A is a block diagram illustrating an example of an Access Point (AP) device 200 in accordance with embodiments described herein. As explained below, the AP device 200 may be used to implement the access point devices 102, 104-1, 104-2, and 104-3 in FIG. 1.

In some embodiments, one or more special-purpose computing systems may be used to implement the AP device 200. Accordingly, various embodiments described herein may be implemented in software, hardware, firmware, or in some combination thereof. The AP device 200 may include one or more memory devices 204, one or more central processing units (CPUs) 210, I/O interfaces 212, other computer-readable media 214, and network interfaces 216.

The one or more memory devices 204 may include one or more various types of non-volatile and/or volatile storage technologies. Examples of the one or more memory devices 204 may include, but are not limited to, flash memory, hard disk drives, optical drives, solid-state drives, various types of random access memory (RAM), various types of read-only memory (ROM), other computer-readable storage media (also referred to as processor-readable storage media), or the like, or any combination thereof. The one or more memory devices 204 may be utilized to store information, including computer-readable instructions that are utilized by the one or more CPUs 210 to perform actions, including those of embodiments described herein.

The one or more memory devices 204 may have stored thereon an Access Point (AP) module 206. The AP module 206 is configured to implement and/or perform some or all of the functions of the AP device 200 described herein. The one or more memory devices 204 may also store other programs and data 208, which may include digital certificates, quality preservation algorithms, connection recovery algorithms, connection recovery rules, network protocols, O-RAN operating rules, user interfaces, operating systems, etc.

I/O interfaces 212 may include enhanced Common Public Radio Interface (eCPRI) ports, Antenna Interface Standards Group (AISG) interfaces, other data input or output interfaces, or the like. Other computer-readable media 214 may include other types of stationary or removable computer-readable media, such as removable flash drives, external hard drives, or the like. Network interfaces 216 are configured to communicate with other computing devices including Radio Unit (RU) devices, User Equipment (UE) devices, and other Access Point (AP) devices. In various embodiments, the network interfaces 216 include transmitters and receivers, a layer 2 (L2) switch and physical network ports (not illustrated) to send and receive data as described herein, and to send and receive instructions, commands and data to implement the processes described herein. In one or more implementations, the network interfaces 216 included in the primary access point device 102 are different than the network interfaces 216 included in the secondary access point devices 104-1, 104-2, and 104-3. For example, each of the secondary access point devices 104-1, 104-2, and 104-3 has an n96 link radio to facilitate connection to the primary access point device 102, and the primary access point device 102 has only has an n96 base station radio.

Figure 2B:
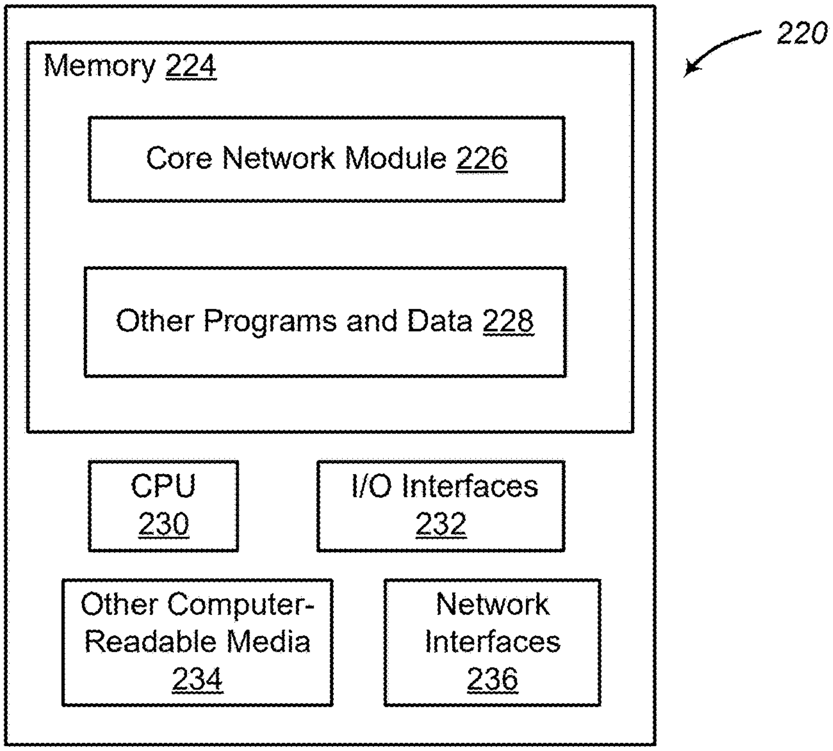
FIG. 2B is a block diagram illustrating an example of core network server device in accordance with embodiments described herein.

FIG. 2B is a block diagram illustrating an example of a computing device 220 in accordance with embodiments described herein. As explained below, the computing device 220 may be used to implement the server device 108 in FIG. 1.

In some embodiments, one or more special-purpose computing systems may be used to implement the computing device 220. Accordingly, various embodiments described herein may be implemented in software, hardware, firmware, or in some combination thereof. The computing device 220 may include one or more memory devices 224, one or more central processing units (CPUs) 230, I/O interfaces 232, other computer-readable media 234, and network interfaces 236.

The one or more memory devices 224 may include one or more various types of non-volatile and/or volatile storage technologies. Examples of the one or more memory devices 224 may include, but are not limited to, flash memory, hard disk drives, optical drives, solid-state drives, various types of RAM, various types of ROM, other computer-readable storage media (also referred to as processor-readable storage media), or the like, or any combination thereof. The one or more memory devices 224 may be utilized to store information, including computer-readable instructions that are utilized by the one or more CPUs 230 to perform actions, including those of embodiments described herein.

The one or more memory devices 224 may have stored thereon a Core Network module 226. The Core Network module 226 is configured to implement and/or perform some or all of the functions of the computing device 220 described herein. The one or more memory devices 224 may also store other programs and data 228, which may include routing algorithms, network performance monitoring software, a network performance parameter database, user interfaces, operating systems, etc.

I/O interfaces 232 may include Universal Serial Bus (USB), other data input or output interfaces, or the like. Other computer-readable media 234 may include other types of stationary or removable computer-readable media, such as removable flash drives, external hard drives, or the like. Network interfaces 236 are configured to communicate with other computing devices located in the Core network (5GC or EPC) 106 and the private network 100. In various embodiments, the network interfaces 236 include physical network ports (not illustrated) to send and receive data as described herein, and to send and receive instructions, commands and data to implement the processes described herein.

Figure 3:
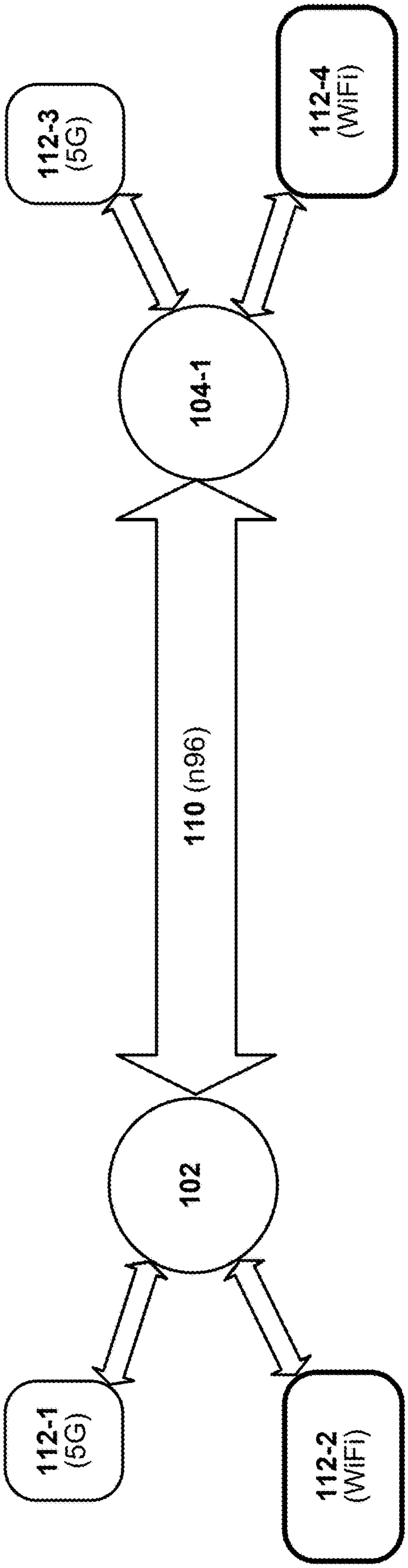
FIG. 3 is a diagram showing a portion of the private network shown in FIG. 1.

FIG. 3 is a diagram showing a portion of the private network shown in FIG. 1. The portion of the private network shown in FIG. 3 includes the primary access point device 102, the secondary access point devices 104-1, and a plurality of user equipment (UE) devices. More particularly, the UE devices include a UE device 112-1 (e.g., a cell phone) that communicates with the primary access point device 102 using one or more 5G NR frequency bands, and a UE device 112-2 (e.g., a tablet computer) that communicates with the primary access point device 102 using one or more WiFi frequency bands. In addition, the UE devices include a UE device 112-3 (e.g., a cell phone) that communicates with the secondary access point devices 104-1 using one or more 5G NR frequency bands, and a UE device 112-4 (e.g., a tablet computer) that communicates with the secondary access point devices 104-1 using one or more WiFi frequency bands. The primary access point device 102 and the secondary access point devices 104-1 communicate with each other using a control channel 110, for example, that uses one or more frequencies in the n96 5G NR band.

In the example of FIG. 3, the primary access point device 102 maintains QCI parameter(s) for wireless streams of the primary access point device 102, including a 5G voice stream, a 5G data stream, a WiFi voice stream, and a WiFi data stream. For the 5G voice stream, the primary access point device 102 maintains QCI parameter(s), $QCI_{Primary\_5G\_DL\_Voice}$, for 5G downlink voice traffic, and QCI parameter(s), $QCI_{Primary\_5G\_UL\_Voice}$, for 5G uplink voice traffic. For the 5G data stream, the primary access point device 102 maintains QCI parameter(s), $QCI_{Primary\_5G\_DL\_Data}$, for 5G downlink data traffic, and QCI parameter(s), $QCI_{Primary\_5G\_UL\_Data}$, for 5G uplink data traffic. For the WiFi voice stream, the primary access point device 102 maintains QCI parameter(s), $QCI_{Primary\_WiFi\_DL\_Voice}$, for WiFi downlink voice traffic, and QCI parameter(s), $QCI_{Primary\_WiFi\_UL\_Voice}$, for WiFi uplink voice traffic. For the WiFi data stream, the primary access point device 102 maintains QCI parameter(s), $QCI_{Primary\_WiFi\_DL\_Data}$, for WiFi downlink data traffic, and QCI parameter(s), $QCI_{Primary\_WiFi\_UL\_Data}$, for WiFi uplink data traffic.

In addition, the primary access point device 102 maintains QCI parameter(s) for four streams per client device (e.g., UE device) of a control channel 110, which may be an n96 link, including an n96 voice stream, an n96 data stream, a WiFi voice stream, and a WiFi data stream. For the n96 voice stream, the primary access point device 102 maintains QCI parameter(s), $QCI_{Primary\_n96\_DL\_Voice}$, for n96 downlink voice traffic, and QCI parameter(s), $QCI_{Primary\_n96\_UL\_Voice}$, for n96 uplink voice traffic. For the n96 data stream, the primary access point device 102 maintains QCI parameter(s), $QCI_{Primary\_n96\_DL\_Data}$, for n96 downlink data traffic, and QCI parameter(s), $QCI_{Primary\_n96\_UL\_Data}$, for n96 uplink data traffic. For the WiFi voice stream, the primary access point device 102 maintains QCI parameter(s), $QCI_{Primary\_WiFi\_DL\_Voice}$, for WiFi downlink voice traffic, and QCI parameter(s), $QCI_{Primary\_WiFi\_UL\_Voice}$, for WiFi uplink voice traffic. For the WiFi data stream, the primary access point device 102 maintains QCI parameter(s), $QCI_{Primary\_WiFi\_DL\_Data}$, for WiFi downlink data traffic, and QCI parameter(s), $QCI_{Primary\_WiFi\_UL\_Data}$, for WiFi uplink data traffic.

Also, the primary access point device 102 maintains QCI parameter(s) for four 5G streams of the secondary access point device 104-1, including a 5G voice stream, a 5G data stream, a WiFi voice stream, and a WiFi data stream. For the 5G voice stream, the primary access point device 102 maintains QCI parameter(s), $QCI_{Secondary\_5G\_DL\_Voice}$, for 5G downlink voice traffic, and QCI parameter(s), $QCI_{Secondary\_5G\_UL\_Voice}$, for 5G uplink voice traffic. For the 5G data stream, the primary access point device 102 maintains QCI parameter(s), $QCI_{Secondary\_5G\_DL\_Data}$, for 5G downlink data traffic, and QCI parameter(s), $QCI_{Secondary\_5G\_UL\_Data}$, for 5G uplink data traffic. For the WiFi voice stream, the primary access point device 102 maintains QCI parameter(s), $QCI_{Secondary\_WiFi\_DL\_Voice}$, for WiFi downlink voice traffic, and QCI parameter(s), $QCI_{Secondary\_WiFi\_UL\_Voice}$, for WiFi uplink voice traffic. For the WiFi data stream, the primary access point device 102 maintains QCI parameter(s), $QCI_{Secondary\_WiFi\_DL\_Data}$, for WiFi downlink data traffic, and QCI parameter(s), $QCI_{Secondary\_WiFi\_UL\_Data}$, for WiFi uplink data traffic.

Additionally, the primary access point device 102 enforces functional requirements for the n96 link and the secondary access point device 104-1. One functional requirement is that QCI of 5G streams over the n96 link, $QCI_{n96\_5G}$, must be greater than QCI of 5G streams of the secondary access point device 104-1, $QCI_{Secondary\_5G}$. Another functional requirement is that QCI of WiFi streams over the n96 link, $QCI_{n96\_WiFi}$, must be greater than QCI of WiFi streams of the secondary access point device 104-1, $QCI_{Secondary\_WiFi}$. Yet another functional requirement is that a bitrate of 5G streams over the n96 link, $Bitrate_{n96\_5G}$, must be greater than a bitrate 5G streams of the secondary access point device 104-1, $Bitrate_{Secondary\_5G}$. Still another functional requirement is that a bitrate of WiFi streams over the n96 link, $Bitrate_{n96\_WiFi}$, must be greater than a bitrate of WiFi streams of the secondary access point device 104-1, $Bitrate_{Secondary\_WiFi}$.

A QCI/QoS preservation function is performed by the primary access point device 102 and the secondary access point device 104-1. The primary access point device 102 and the secondary access point device 104-1 monitor all local access points stream requests for bitrate and QCI/QoS across different frequency bands (e.g., n77, n48, and WiFi frequency bands). For example, the secondary access point device 104-1 aggregates local traffic and then allocates and schedules transmissions, and the primary access point device 102 determines bitrates that are required in order to preserver QCI/QoS.

The primary access point device 102 calculates modifications to bitrate and QCI/QoS, and sets them for the n96 link. More particularly, the primary access point device 102 ensures that QCI of 5G streams over the n96 link, $QCI_{n96\_5G}$, is greater than or equal to QCI of 5G streams of the secondary access point device 104-1, $QCI_{Secondary\_5G}$, plus a QCI Index Margin Increment. The primary access point device 102 also determines a QoS value for WiFi streams, $QoS_{Secondary\_WiFi}$, and converts the QoS value to an equivalent QCI, $QCI_{Secondary\_WiFi}$, and ensures that QCI of WiFi streams over the n96 link, $QCI_{n96\_WiFi}$, is greater than or equal to the QCI of WiFi streams of the secondary access point device 104-1, $QCI_{Secondary\_WiFi}$, plus an Index Margin Increment. In addition, the primary access point device 102 ensures that the bitrate of 5G streams over the n96 link, $Bitrate_{n96\_5G}$, is greater than or equal to a bitrate 5G streams of the secondary access point device 104-1, $Bitrate_{Secondary\_5G}$, plus a Bitrate Margin Increment. Additionally, the primary access point device 102 ensures that a bitrate of WiFi streams over the n96 link, $Bitrate_{n96\_WiFi}$, is greater than or equal to the bitrate of WiFi streams of the secondary access point device 104-1, $Bitrate_{Secondary\_WiFi}$, plus the Bitrate Margin Increment.

The primary access point device 102 and the secondary access point device 104-1 calculate margin adjustments for buffer status at the n96 link and 5G/WiFi interfaces. The primary access point device 102 and the secondary access point device 104-1 also arbitrate 5G stream and WiFi streams, and may give priority to 5G streams.

If any of the UE devices 112-1, 112-2, 112-3, and 112-4 does not provide specific QCI/QoS parameter(s), the primary access point device 102 or the secondary access point device 104-1 must select such parameters. The primary access point device 102 or the secondary access point device 104-1 selects default QCI/QoS parameter(s) that meet the functional requirements and preservation function described above.

The primary access point device 102 and the secondary access point device 104-1 may perform dynamic QCI/QoS preservation functions over time. As a UE device changes stream requirements over time, the primary access point device 102 or the secondary access point device 104-1 modifies n96 streams such that QCI/QoS is preserved. Also, as total traffic flow increases or decreases, the primary access point device 102 or the secondary access point device 104-1 modifies n96 streams such that QCI/QoS is preserved. In addition, according to scheduling changes based on time of day, occupancy, emergency alert, etc., the primary access point device 102 or the secondary access point device 104-1 modifies n96 streams such that QCI/QoS is preserved. For example, the primary access point device 102 or the secondary access point device 104-1 modifies a number of carries used, a bandwidth of each of the carriers, buffer sizes, etc. streams such that QCI/QoS is preserved.

Additionally or alternatively, the primary access point device 102 or the secondary access point device 104-1 may perform static QCI/QoS preservation functions. The primary access point device 102 or the secondary access point device 104-1 may uses preset QCI/QoS parameters per given device stream type, device type, device capability, installation needs, etc. The primary access point device 102 or the secondary access point device 104-1 may also ensure that administrative and/or service channels are dedicated and always available at 5G and WiFi. In addition, the primary access point device 102 or the secondary access point device 104-1 may provide for first responder emergency channel access and/or override functions.

In addition, QCI/QoS preservation and optimization functions are performed in the Core network (5GC or EPC) 106. More particularly, QCI/QoS preservation management functions and QCI/QoS preservation optimization functions are performed by the server device 108 in the Core network (5GC or EPC) 106. In one or more implementations, the server device 108 includes multiple servers in a cloud computing environment. In one or more implementations, the QCI/QoS preservation and optimization functions may be included in the primary access point device 102 given local specific operation. The primary access point device 102 may not have enough CPU/memory to handle the QCI/QoS preservation and optimization functions thus pushing up to the Core network (5GC or EPC) 106. In one or more implementations, the QCI/QoS preservation and optimization functions may be a shared function between the primary access point device 102 and the Core network (5GC or EPC) 106.

The QCI/QoS preservation management functions performed in the Core network (5GC or EPC) 106 include establishing a command/control channel to each primary access point device (e.g., primary access point device 102) and each secondary access point device (e.g., secondary access point device 104-1). The QCI/QoS preservation management functions performed in the Core network (5GC or EPC) 106 also include collecting performance metrics and various settings from each UE device, primary access point device, and secondary access point device, wherein such settings include QCI, QoS, bitrate, etc. Additionally, the Core network (5GC or EPC) 106 establishes and maintains system routing and connectivity maps based on deployment information. The Core network (5GC or EPC) 106 also collects unique identifiers for each UE device, primary access point device, and secondary access point device, and reports on system performance and settings for administration. The Core network (5GC or EPC) 106 provides an option for an operator to manually change and set new values statically per UE device, primary access point device, and secondary access point device. Also, the Core network (5GC or EPC) 106 provides an option to enforce establish settings policies including overriding different parts of the system. Enforcement of the QCI/QoS preservation management functions may be based on UE device, primary access point device, and secondary access point devices, stream types, day, time, etc.

The QCI/QoS preservation optimization functions performed in the Core network (5GC or EPC) 106 have goals, which may be implemented using artificial intelligence and/or machine learning techniques. Such goals include setting upstream QCI, QoS, and bitrate to ensure UE link parameters are always met. Also, such goals include minimization of incremental QCI, QoS, and bitrate amount to preserve link efficiency, and minimization of margin increments to improve link efficiency allowing more bandwidth. Static settings from settings policies may be included in calculations. Dynamic settings based on stream demand variations with hysteresis may be used. Also, dynamic rerouting of streams between primary access point devices and secondary access point devices based on deployment information may be used.

The QCI/QoS preservation optimization functions performed in the Core network (5GC or EPC) 106 include setting and monitoring all performance parameters per stream. Also, the QCI/QoS preservation optimization functions performed in the Core network (5GC or EPC) 106 include tracking and storing performance and optimization parameters per unique identifier. As unique identifiers are known, performance and parameters can be pre-applied as a baseline at a next attach to network.

FIGS. 4A, 4B, and 4C are diagrams of example private network systems in accordance with embodiments described herein. FIG. 4A shows an example of a baseline private network system that includes one primary access point device 102 and three secondary access point devices 104-1, 104-2, and 104-3. The example baseline private network system shown in FIG. 4A includes three secondary access point devices; however, baseline private network systems in accordance with the present disclosure may include fewer or more secondary access point devices.

FIG. 4B shows an example of a mesh private network system that includes an alternate routing option. The private network system shown in FIG. 4B includes two primary access point device 102-1 and 102-2 and one secondary access point device 104. The QCI/QoS preservation function performed by the Core network (5GC or EPC) 106 shown in FIG. 1 can dynamically select which of the primary access point device 102-1 and 102-2 the secondary access point device 104 will use, based on overall system performance and loading of each of the primary access point device 102-1 and 102-2, available throughput, or specific QCI and bitrate needs of downstream UE devices (not shown in FIG. 4B).

For example, the server device 108 shown in FIG. 1 configures a communication link (e.g., control channel) between the secondary access point device 104 and the primary access point device 102-2 in response to determining that stream requirements (e.g., a loading) of the primary access point device 102-1 is greater than a first threshold value. By way of another example, the server device 108 shown in FIG. 1 configures a communication link (e.g., control channel) between the secondary access point device 104 and the primary access point device 102-2 in response to determining that stream requirements (e.g., a throughput) of primary access point device 102-1 is less than a second threshold value.

FIG. 4C shows an example of a cascaded private network system. The cascaded private network system shown in FIG. 4C includes four primary access point devices 102-1, 102-2, 102-3, and 102-4, and seven secondary access point devices 104-1, 104-2, 104-3, 104-4, 104-5, 104-6, and 104-7. The primary access point device 102-1 wirelessly communicates with the primary access point device 102-2, which wirelessly communicates with the primary access point device 102-3 and the secondary access point devices 104-1 and 104-2. The primary access point device 102-3 wirelessly communicates with the primary access point device 102-4 and the secondary access point device 104-3 and 104-4. The primary access point device 102-4 wirelessly communicates with the secondary access point device 104-5, 104-6, and 104-7.

In the example of FIG. 4C, the primary access point device 102-1 configures user streams between the primary access point device 102-1 and each of the other primary access point device 102-2, 102-3, and 102-4 based on QoS/QCI requirement of the client devices (not shown) that connect to the private network via the secondary access point devices 104-1, 104-2, 104-3, 104-4, 104-5, 104-6, and 104-7. For example, as additional client devices connect to the secondary access point devices 104-1, 104-2, 104-3, 104-4, 104-5, 104-6, and 104-7, the primary access point device 102-1 increases the bandwidth of one of more those user streams. Also, client devices disconnect from the secondary access point devices 104-1, 104-2, 104-3, 104-4, 104-5, 104-6, and 104-7, the primary access point device 102-1 decreases the bandwidth of one of more those user streams.

FIG. 5 shows an example of a cascaded private network system 500. The cascaded private network system 500 includes one primary access point device 102 and two secondary access point devices 104-1 and 104-2. The primary access point device 102 communicates with a Core network (e.g., Internet, Cloud, Core) 106 using a wired connection 502 (e.g., an optical fiber connection), and also communicates with the secondary access point devices 104-1 using a first n96 link 504. The secondary access point devices 104-1 communicates with the secondary access point devices 104-2 using a second n96 link 506.

As described below in detail, the private network system 500 transmits a plurality of UE streams for a plurality of UE devices connected the access point devices 102, 104-1 and 104-2. Each UE stream has its own quality and bitrate and margins. This insures that the performance of each stream is evaluated separately and is not combined with other streams. The primary access point device 102 observes all UE streams independently, including directly connected UE streams and UE streams cascaded downstream to preserve requirements of each stream.

In the example of FIG. 5, a first UE device 112-1 is directly connected to the primary access point device 102 (i.e., not cascaded). Accordingly, an n96 margin is not needed for a UE stream S1 transmitted to/from the UE device 112-1. The primary access point device 102 maintains parameters of the UE stream S1 transmitted to/from the UE device 112-1, namely, UE_#1_5G_Bitrate and UE_#1_5G_QCI. Also, a UE device 112-2 is directly connected to the primary access point device 102 (i.e., not cascaded). Accordingly, an n96 margin is not needed for a UE stream S2 transmitted to/from the UE device 112-2. The primary access point device 102 maintains parameters of the UE stream S2 transmitted to/from the UE 112-2 device, namely, UE_#2_5G_Bitrate and UE_#2_5G_QCI.

A UE device 112-3 is directly connected to the secondary access point device 104-1 (i.e., not cascaded). The primary access point device 102 maintains parameters of a UE stream S3 transmitted to/from the UE device 112-3, namely, UE_#3_5G_Bitrate and UE_#3_5G_QCI. Also, a UE device 112-4 is directly connected to the secondary access point device 104-1 (i.e., not cascaded). The primary access point device 102 maintains parameters of a UE stream S4 transmitted to/from the UE 112-4 device, namely, UE_#4_5G_Bitrate and UE_#4_5G_QCI.

A UE device 112-5 is directly connected to the secondary access point device 104-2 (i.e., not cascaded). The primary access point device 102 maintains parameters of a UE stream S5 transmitted to/from the UE device 112-5, namely, UE_#5_5G_Bitrate and UE_#5_5G_QCI. Also, a UE device 112-6 is directly connected to the secondary access point device 104-2 (i.e., not cascaded). The primary access point device 102 maintains parameters of a UE stream S6 transmitted to/from the UE 112-6 device, namely, UE_#6_5G_Bitrate and UE_#6_5G_QCI.

The primary access point device 102 maintains parameters for the streams S3, S4, S5, and S6 such that all n96_1 streams transmitted using the first n96 link 504 must in total be less than max bitrate of total n96_1 link. More particularly, the primary access point device 102 maintains the parameters for the streams S3, S4, S5, and S6 as shown below in Table 2.

In the tables that follow, "AP_2" corresponds to the secondary access point device 104-1, and "AP_3" corresponds to the secondary access point device 104-2. Also, "UE_#1", "UE_#2", "UE #3", "UE_#4", "UE_#5", and "UE_#6" respectively correspond to the UE devices 112-1, 112-2, 112-3, 112-4, 112-5, and 112-6.

TABLE 2

| |
|---|
| n96_#1_5G_Bitrate_UE_#3 = UE_#3_5G_Bitrate + AP_2_5G_Bitrate_Margin |
| n96_#1_5G_QCI_UE_#3 = UE_#3_5G_QCI + AP_2_5G_QCI_Margin |
| n96_#1_WiFi_Bitrate_#4 = UE_#4_WiFi_Bitrate + AP_2_WiFi_Bitrate_Margin |
| n96_#1_WiFi_QOS_#4 = UE_#4_WiFi_QOS + AP_2_WiFi_QOS_Margin |
| n96_#1_5G_Bitrate_UE_#5 = |
| UE_#5_5G_Bitrate + AP_3_5G_Bitrate_Margin + AP_2_5G_Bitrate_Margin |
| n96_#1_5G_QCI_UE_#5 = |
| UE_#5_5G_QCI + AP_3_5G_QCI_Margin + AP_2_5G_QCI_Margin |
| n96_#1_WiFi_Bitrate_#6 = |
| UE_#6_WiFi_Bitrate + AP_3_WiFi_Bitrate_Margin + AP_2_WiFi_Bitrate_Margin |
| n96_#1_WiFi_QOS_#6 = |
| UE_#6_WiFi_QOS + AP_3_WiFi_QOS_Margin + AP_2_QOS_Margin |

Additionally, the primary access point device 102 maintains parameters for the streams S5 and S6 such that all n96_2 streams transmitted using the second n96 link 506 must in total be less than max bitrate of total n96_2 link. More particularly, the primary access point device 102 maintains the parameters for the streams S5 and S6 as shown below in Table 3.

TABLE 3

| |
|---|
| n96_#2_5G_Bitrate_UE_#5 = UE_#5_5G_Bitrate + AP_3_5G_Bitrate_Margin |
| n96_#2_5G_QCI_UE_#5 = UE_#5_5G_QCI + AP_3_5G_QCI_Margin |
| n96_#2_WiFi_Bitrate_#6 = UE_#6_WiFi_Bitrate + AP_3_WiFi_Bitrate_Margin |
| n96_#2_WiFi_QOS_#6 = UE_#6_WiFi_QOS + AP_3_WiFi_QOS_Margin |

The streams managed at the primary access point device 102 are summarized as shown below in Table 4.

TABLE 4

| |
|---|
| UE_#1_5G_Bitrate |
| UE_#1_5G_QCI |
| UE_#2_WiFi_Bitrate |
| UE_#2_WiFi_QOS |
| n96_#1_5G_Bitrate_UE_#5 = |
| UE_#5_5G_Bitrate + AP_3_5G_Bitrate_Margin + AP_2_5G_Bitrate_Margin |
| n96_#1_5G_QCI_UE_#5 = |
| UE_#5_5G_QCI + AP_3_5G_QCI_Margin + AP_2_5G_QCI_Margin |
| n96_#1_5G_Bitrate_UE_#3 = UE_#3_5G_Bitrate + AP_2_5G_Bitrate_Margin |
| n96_#1_5G_QCI_UE_#3 = UE_#3_5G_QCI + AP_2_5G_QCI_Margin |
| n96_#1_WiFi_Bitrate_#4 = UE_#4_WiFi_Bitrate + AP_2_WiFi_Bitrate_Margin |
| n96_#1_WiFi_QOS_#4 = UE_#4_WiFi_QOS + AP_2_WiFi_QOS_Margin |
| n96_#1_WiFi_Bitrate_#6 = |
| UE_#6_WiFi_Bitrate + AP_3_WiFi_Bitrate_Margin + AP_2_WiFi_Bitrate_Margin |
| n96_#1_WiFi_QOS_#6 = |
| UE_#6_WiFi_QOS + AP_3_WiFi_QOS_Margin + AP_2_QOS_Margin |

Figure 6A:
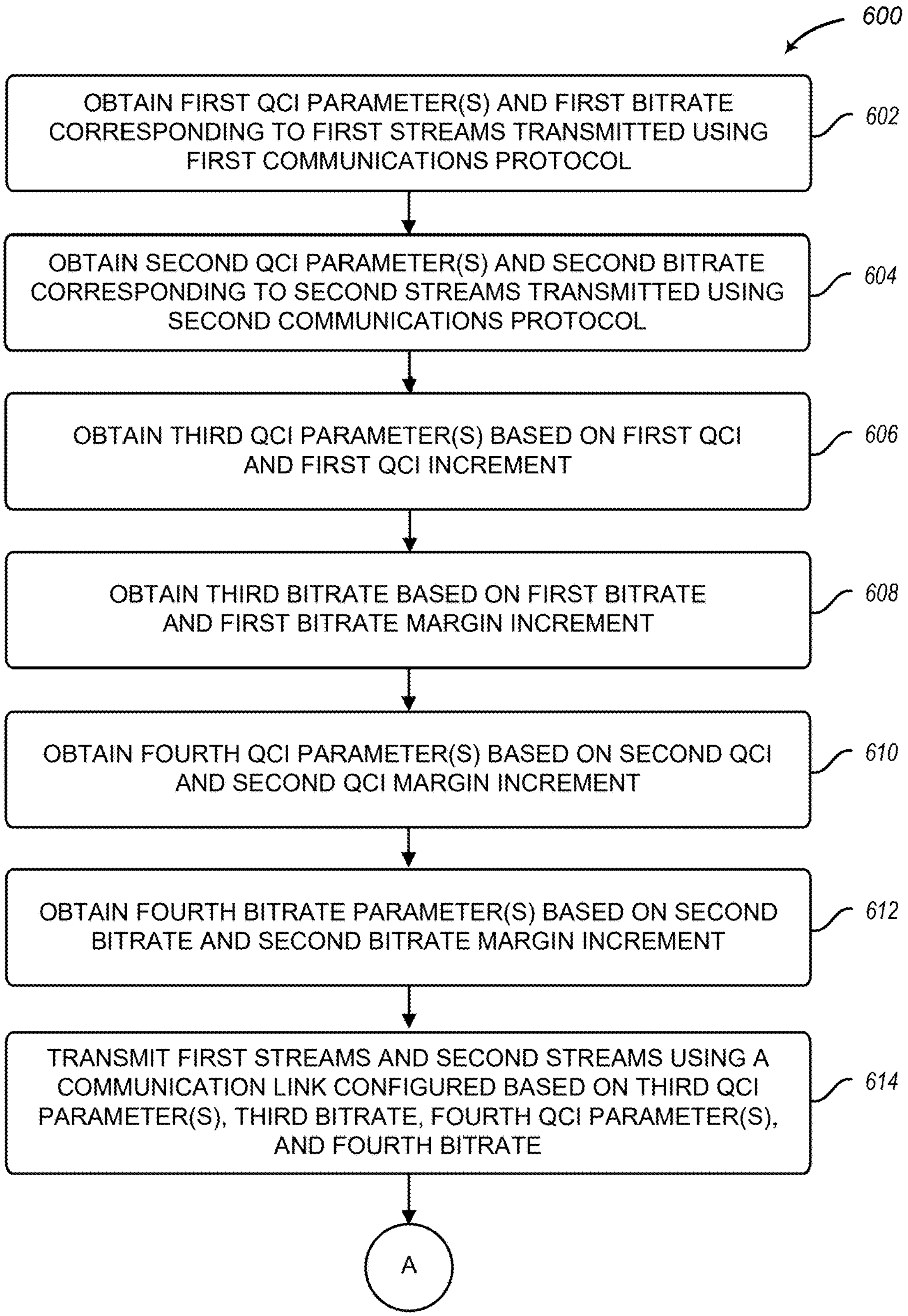
FIGS. 6A and 6B show a flowchart of a method in accordance with embodiments described herein.
Figure 6B:
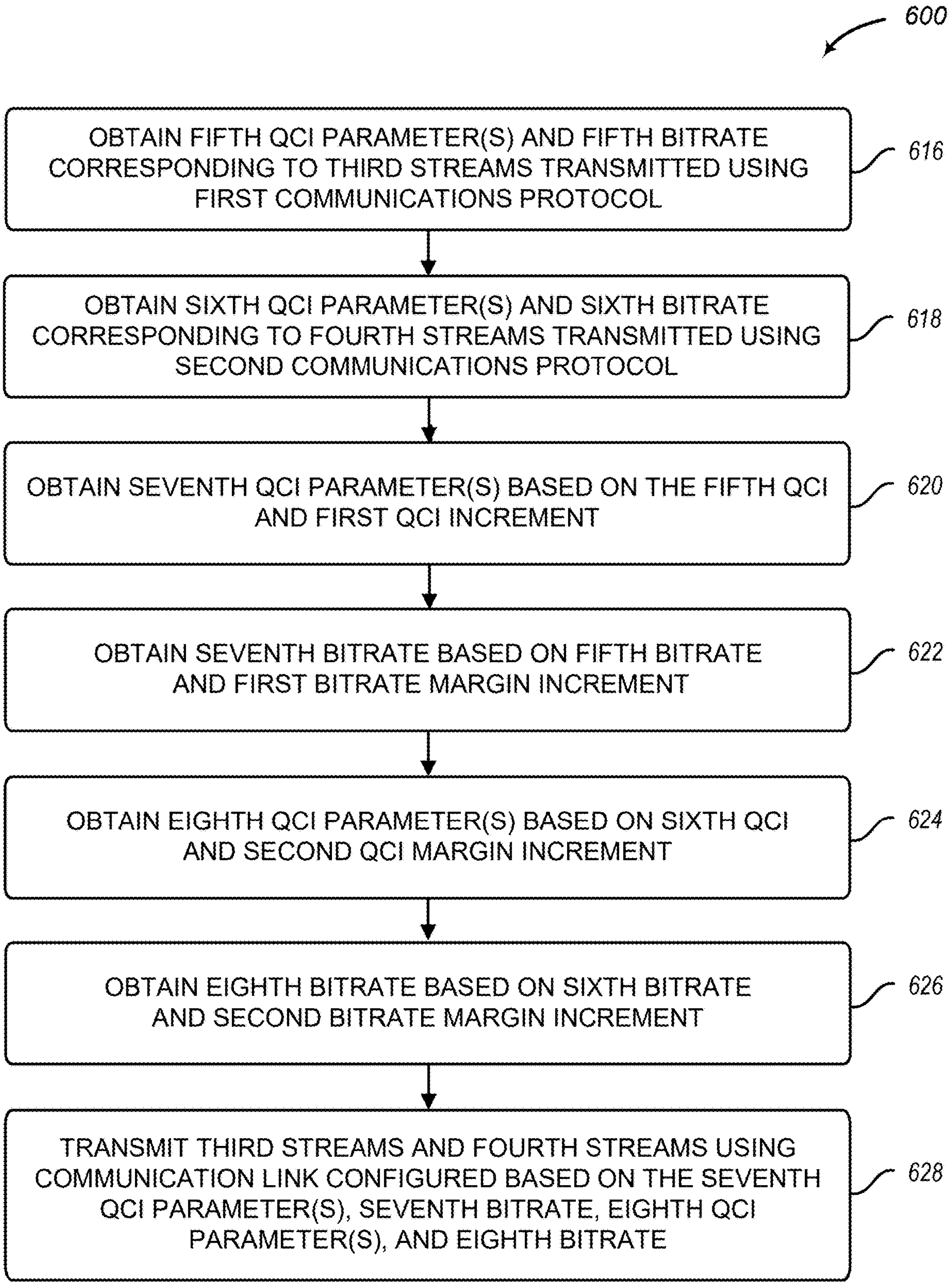

FIGS. 6A and 6B show a flowchart of a method 600 in accordance with embodiments described herein. The method 600 is performed by an access point in a private network. For example, the method 600 is performed by the primary access point device 102 in the private network 100 shown in FIG. 1. The method begins at 602.

At 602, a first quality of service (QoS) class identifier (QCI) parameter value(s) and a first bitrate value are obtained based on one or more first stream requests corresponding to one or more first streams transmitted using a first communications protocol. For example, the primary access point device 102 obtains, based on a stream request corresponding to a stream transmitted using 5G by a user equipment (UE) device that communicates with the secondary access point device 104-1, a QCI value, $QCI_{Primary\_5G}$, and a bitrate value, $Bitrate_{Primary\_5G}$. Also, the primary access point device 102 obtains, based on a stream request corresponding to a stream transmitted using 5G by a UE device that communicates with the secondary access point device 104-1, QCI parameter value(s), $QCI_{Secondary\_5G}$, and a bitrate value, $Bitrate_{Secondary\_5G}$. The primary access point device 102 then combines (e.g., adds) the values of $QCI_{Primary\_5G}$ and $QCI_{Secondary\_5G}$ to obtain the first QCI parameter value(s), QCI-1$_{_5G}$. In addition, the primary access point device 102 combines (e.g., adds) the values of $Bitrate_{Primary\_5G}$ and $Bitrate_{Secondary\_5G}$ to obtain the first bitrate value, Bitrate-1$_{_5G}$. The method 600 then proceeds to 604.

At 604, a second QCI and a second bitrate are obtained based on one or more second stream requests corresponding to one or more second streams transmitted using a second communications protocol, where the second communications protocol is different from the first communications protocol. For example, the primary access point device 102 obtains, based on a stream request corresponding to a stream transmitted using WiFi by a UE device that communicates with the secondary access point device 104-1, a QCI parameter value(s), $QCI_{Primary\_WiFi}$, and a bitrate value, $Bitrate_{Primary\_WiFi}$. Also, the primary access point device 102 obtains, based on a stream request corresponding to a stream transmitted using WiFi by a UE device that communicates with the secondary access point device 104-1, QCI parameter value(s), $QCI_{Secondary\_WiFi}$, and a bitrate value, $Bitrate_{Secondary\_WiFi}$. The primary access point device 102 then combines (e.g., adds) the values of $QCI_{Primary\_WiFi}$ and $QCI_{Secondary\_WiFi}$ to obtain the second QCI parameter value(s), QCI-2$_{_WiFi}$. In addition, the primary access point device 102 combines (e.g., adds) the values of $Bitrate_{Primary\_WiFi}$ and $Bitrate_{Secondary\_WiFi}$ to obtain the second bitrate value, Bitrate-2$_{_5G}$. The method 600 then proceeds to 606.

At 606, third QCI parameter value(s) are obtained based on the first QCI parameter value(s) obtained at 602 and a first QCI margin increment value. For example, the first QCI margin increment value is determined based on network simulations, and selected to ensure that a desired QCI/QOS is preserved. Also, the primary access point device 102 obtains the third QCI parameter value(s), QCI-3$_{_5G}$, by adding the first QCI margin increment value to a QCI value included in the first QCI parameter value(s), QCI-1$_{_5G}$. The method 600 then proceeds to 608.

At 608, a third bitrate value is obtained based on the first bitrate value obtained at 602 and a first bitrate margin increment value. For example, the first bitrate margin increment value is determined based on network simulations, and selected to ensure that the desired QCI/QOS is preserved. Also, the primary access point device 102 obtains the third bitrate value, Bitrate-3$_{_5G}$, by adding the first bitrate margin increment value to the first Bitrate value, Bitrate-1$_{_5G}$. The method 600 then proceeds to 610.

At 610, fourth QCI parameter value(s) are obtained based on the second QCI parameter value(s) obtained at 604 and a second QCI margin increment. For example, the second QCI margin increment value is determined based on network simulations, and selected to ensure that the desired QCI/QOS is preserved. Also, the primary access point device 102 obtains the fourth QCI parameter value(s), QCI-4$_{_5G}$, by adding the second QCI margin increment value to a QCI value included in the second QCI parameter value(s), QCI-2$_{_5G}$. The method 600 then proceeds to 612.

At 612, a fourth bitrate value is obtained based on the second bitrate value obtained at 604 and a second bitrate margin increment value. For example, the second bitrate margin increment value is determined based on network simulations, and selected to ensure that the desired QCI/QOS is preserved. Also, the primary access point device 102 obtains the fourth bitrate value, Bitrate-$4_{\_5G}$, by adding the second bitrate margin increment value to the second Bitrate value, Bitrate-$2_{\_5G}$. The method 600 then proceeds to 614.

At 614, the one or more first streams and the one or more second streams are transmitted using a communication link (e.g., user stream), where the communication link is configured based on the third QCI parameter value(s) obtained at 606, the third bitrate value obtained at 608, the fourth QCI parameter value(s) obtained at 610, and the fourth bitrate value obtained at 612. For example, the primary access point device 102 transmits the plurality of 5G data streams and the plurality of WiFi streams using a control channel or communication link configured based on the third QCI parameter value(s), QCI-$3_{\_5G}$, the third bitrate value, Bitrate-$3_{\_5G}$, the fourth QCI parameter value(s), QCI-$4_{\_WiFi}$, and the fourth bitrate value, Bitrate-$4_{\_WiFi}$.

By way of example, the primary access point device 102 combines (e.g., adds) the third QCI parameter value(s), QCI-$3_{\_5G}$, and the fourth QCI parameter value(s), QCI-$4_{\_WiFi}$, to obtain a QCI value for a user stream. Also, the primary access point device 102 combines (e.g., adds) the third bitrate value, Bitrate-$3_{\_5G}$, and the fourth bitrate value, Bitrate-$4_{\_WiFi}$, to obtain a bitrate value for the user stream. In addition, the primary access point device 102 stores a data structure (e.g., a table) that associates a plurality of QCI parameter value(s) and corresponding bitrate values in association with channel parameters that preserve QoS/QCI, such as a number of carriers on different frequencies and corresponding bandwidths for each of the carriers. The primary access point device 102 obtains from the data structure channel parameters corresponding to the QCI value and the bitrate value for the user stream, which are used to configure the user stream such that QoS/QCI is maintained and preserved. The method 600 then proceeds to 616.

At 616, fifth QCI parameter value(s) and a fifth bitrate value are obtained based on one or more first stream requests corresponding to one or more third streams transmitted using a first communications protocol. For example, the primary access point device 102 obtains, based on a stream request corresponding to a stream transmitted using 5G by a user equipment (UE) device that communicates with the primary access point device 102, QCI parameter value(s), $QCI_{Primary\_5G}$, and a bitrate value, $Bitrate_{Primary\_5G}$. Also, the primary access point device 102 obtains, based on a stream request corresponding to a stream transmitted using 5G by a UE device that communicates with the secondary access point device 104-1, QCI parameter value(s), $QCI_{Secondary\_5G}$, and a bitrate value, $Bitrate_{Secondary\_5G}$. The primary access point device 102 then combines (e.g., adds) the values of $QCI_{Primary\_5G}$ and $QCI_{Secondary\_5G}$ to obtain the fifth QCI parameter value(s), QCI-$5_{\_5G}$. In addition, the primary access point device 102 combines (e.g., adds) the values of $Bitrate_{Primary\_5G}$ and $Bitrate_{Secondary\_5G}$ to obtain the fifth bitrate value, Bitrate-$5_{\_5G}$. The method 600 then proceeds to 618.

At 618, sixth QCI parameter value(s) and a sixth bitrate value are obtained based on one or more second stream requests corresponding to a plurality of forth streams transmitted using a second communications protocol, where the second communications protocol is different from the first communications protocol. For example, the primary access point device 102 obtains, based on a stream request corresponding to a stream transmitted using WiFi by a UE device that communicates with the primary access point device 102, QCI value parameter value(s), $QCI_{Primary\_WiFi}$, and a bitrate value, $Bitrate_{Primary\_WiFi}$. Also, the primary access point device 102 obtains, based on a stream request corresponding to a stream transmitted using WiFi by a UE device that communicates with the secondary access point device 104-1, a QCI value, $QCI_{Secondary\_WiFi}$, and a bitrate value, $Bitrate_{Secondary\_WiFi}$. The primary access point device 102 then combines (e.g., adds) the values of $QCI_{Primary\_WiFi}$ and $QCI_{Secondary\_WiFi}$ to obtain the sixth QCI parameter value(s), QCI-$6_{\_WiFi}$. In addition, the primary access point device 102 combines (e.g., adds) the values of $Bitrate_{Primary\_WiFi}$ and $Bitrate_{Secondary\_WiFi}$ to obtain the sixth bitrate value, Bitrate-$6_{\_5G}$. The method 600 then proceeds to 620.

At 620, seventh QCI parameter value(s) are obtained based on the fifth QCI parameter value(s) obtained at 616 and the first QCI margin increment value. For example, the primary access point device 102 obtains the seventh QCI parameter value(s), QCI-$7_{\_5G}$, by adding the first QCI margin increment value to a QCI value included in the fifth QCI parameter value(s), QCI-$5_{\_5G}$. The method 600 then proceeds to 622.

At 622, a seventh bitrate value is obtained based on the fifth bitrate value obtained at 616 and a first bitrate margin increment value. For example, the primary access point device 102 obtains the seventh bitrate value, Bitrate-$7_{\_5G}$, by adding the first bitrate margin increment value to the fifth bitrate value, Bitrate-$5_{\_5G}$. The method 600 then proceeds to 624.

At 624, eighth QCI parameter value(s) are obtained based on the second QCI obtained at 618 and the second QCI margin increment. For example, the primary access point device 102 obtains the eighth QCI parameter value(s), QCI-$8_{\_5G}$, by adding the second QCI margin increment value to a QCI value included in the sixth QCI value, QCI-$6_{\_5G}$. The method 600 then proceeds to 626.

At 626, an eighth bitrate value is obtained based on the sixth bitrate value obtained at 618 and the second bitrate margin increment value. For example, the primary access point device 102 obtains the eighth bitrate value, Bitrate-$8_{\_5G}$, by adding the second bitrate margin increment value to the sixth bitrate value, Bitrate-$6_{\_5G}$. The method 600 then proceeds to 628.

At 628, the one or more third streams and the plurality of forth streams are transmitted using a communication link, where the communication link is configured based on the seventh QCI parameter value(s) obtained at 620, the seventh bitrate value obtained at 622, the eighth QCI parameter value(s) obtained at 624, and the eighth bitrate value obtained at 626. For example, the primary access point device 102 transmits the plurality of 5G data streams and the plurality of WiFi streams using a control channel configured based on the seventh QCI parameter value(s), QCI-$7_{\_5G}$, the seventh bitrate value, Bitrate-$7_{\_5G}$, the eighth QCI parameter value(s), QCI-$8_{\_WiFi}$, and the eighth bitrate value, Bitrate-$8_{\_WiFi}$. The method 600 then ends.

Figure 7A:
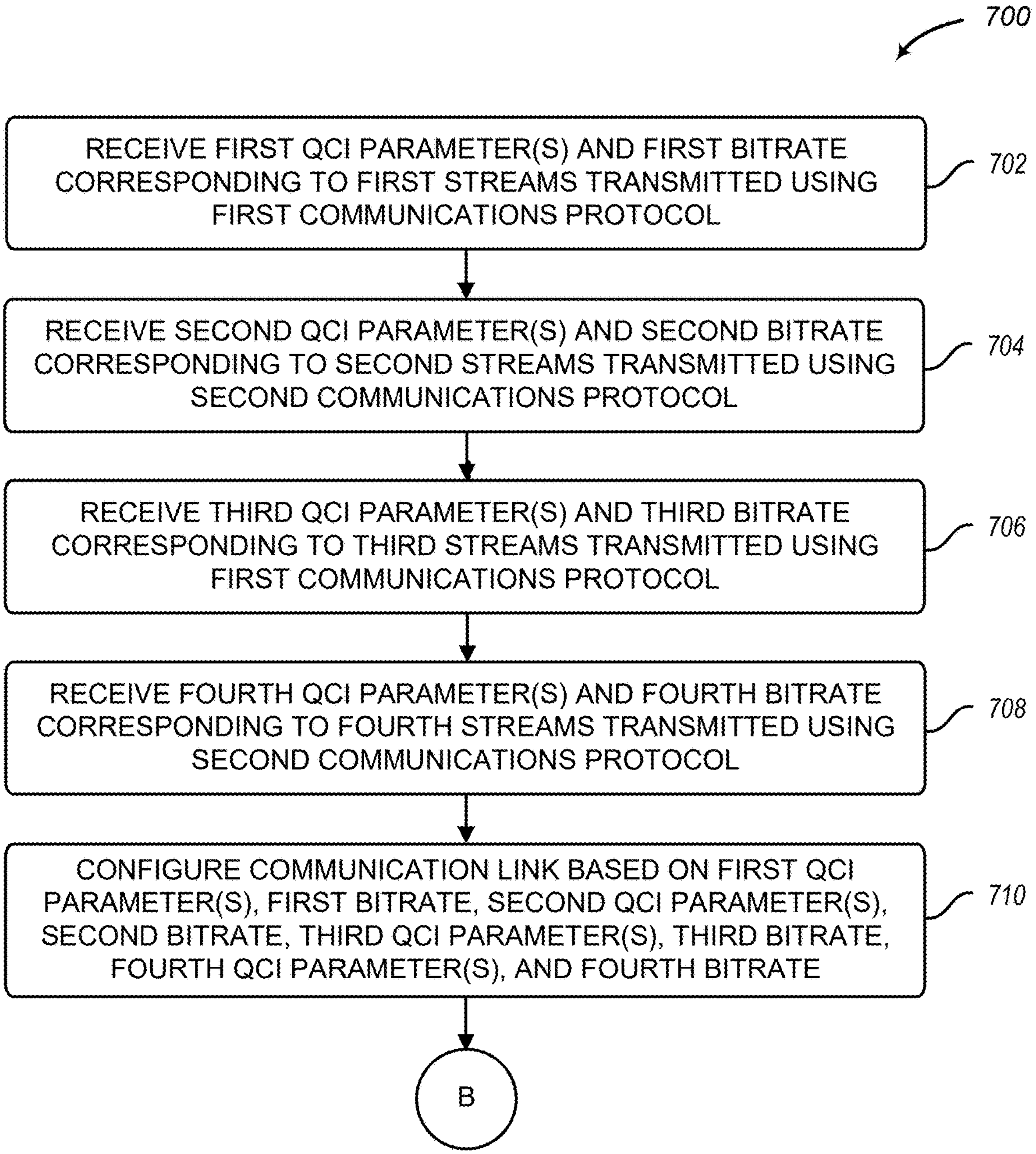
FIGS. 7A and 7B show another flowchart of another method in accordance with embodiments described herein.
Figure 7B:
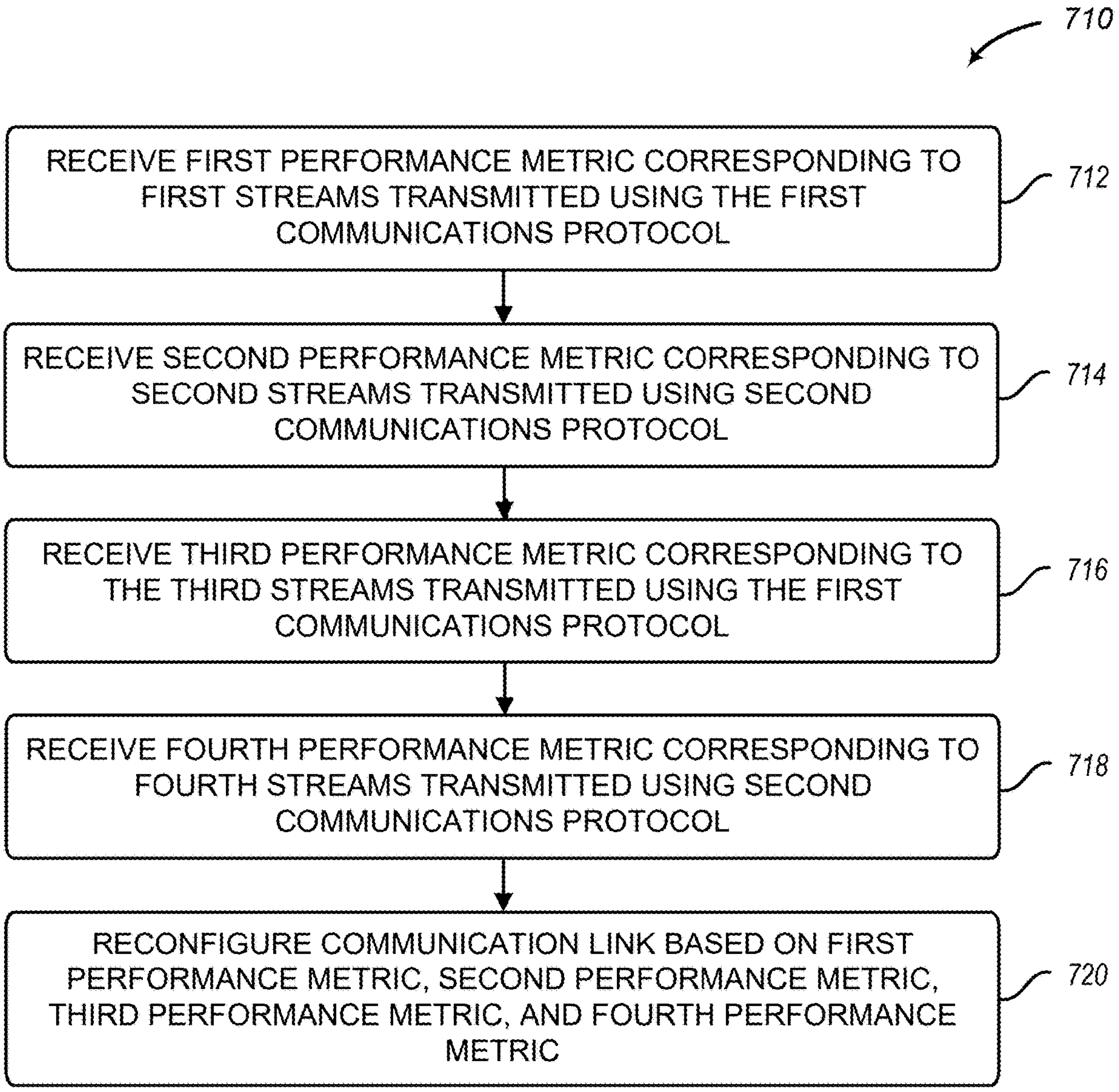

FIGS. 7A and 7B show a flowchart of a method 700 in accordance with embodiments described herein. The method 700 is performed in a core network that communicates with a private network. For example, the method 700 is performed by the server device 108 in the Core network (5GC or EPC) 106, which communicates with the private network 100 shown in FIG. 1. The method begins at 702.

At 702, first quality of service (QoS) class identifier (QCI) parameter value(s) and a first bitrate value corresponding to one or more first streams transmitted using a first communications protocol are received from a primary access point of the private network. For example, the server device 108 receives, from the primary access point 102 of the private network 100, the first QCI parameter value(s) and the first bitrate value corresponding to one or more first streams transmitted using a cellular communications protocol such as 5G. The method 700 then proceeds to 704.

At 704, second QCI parameter value(s) and a second bitrate value corresponding to one or more first streams transmitted using a first communications protocol are received from a primary access point of the private network. For example, the server device 108 receives, from the primary access point 102 of the private network 100, the second first QCI parameter value(s) and the second bitrate value corresponding to one or more second streams transmitted using a WLAN communications protocol such as WiFi. The method 700 then proceeds to 706.

At 706, third QCI parameter value(s) and a third bitrate value corresponding to one or more third streams transmitted using the first communications protocol are received from a primary access point of the private network. For example, the server device 108 receives, from the primary access point 102 of the private network 100, the third first QCI parameter value(s) and the third bitrate value corresponding to one or more third streams transmitted using a cellular communications protocol such as 5G. The method 700 then proceeds to 708.

At 708, fourth QCI parameter value(s) and a fourth bitrate value corresponding to one or more fourth streams transmitted using the second communications protocol are received from a primary access point of the private network. For example, the server device 108 receives, from the primary access point 102 of the private network 100, the fourth first QCI parameter value(s) and the fourth bitrate value corresponding to one or more fourth streams transmitted using a WLAN communications protocol such as WiFi. The method 700 then proceeds to 710.

At 710, a communication link between the primary access point and the secondary access point of the private network is configured based on the first QCI parameter value(s), the first bitrate value, the second QCI parameter value(s), the second bitrate value, the third QCI parameter value(s), the third bitrate value, the fourth QCI parameter value(s), and the fourth bitrate value. For example, the server device 108 configures a control channel between the primary access point 102 and the secondary access point 104-1 of the private network 100 based on the first QCI parameter value(s), the first bitrate value, the second QCI parameter value(s), the second bitrate value, the third QCI parameter value(s), the third bitrate value, the fourth QCI parameter value(s), and the fourth bitrate value.

By way of example, the server device 108 combines (e.g., adds) the first QCI parameter value(s) and the second QCI parameter value(s) to obtain composite QCI parameter value(s), and also combines (e.g., adds) the first bitrate value and the second bitrate value to obtain a composite bitrate value. The server device 108 also stores a data structure (e.g., a table) that associates a plurality of QCI parameter value(s) and corresponding bitrate values in association with channel parameters that preserve QoS/QCI, such as a number of carriers on different frequencies and corresponding bandwidths for each carrier frequency, which have been obtained via network simulations. The primary access point device 102 obtains, from the data structure, channel parameters corresponding to the composite QCI parameter value(s) and the composite bitrate value. The server device 108 then transmits message(s) to the primary access point device 102, which cause the primary access point device 102 to configure the communication link between the primary access point 102 and the secondary access point 104-1 of the private network 100 such that QoS/QCI is maintained and preserved. The method 700 then proceeds to 712.

At 712, a first performance metric corresponding to the one or more first streams transmitted using the first communications protocol is received from the primary access point of the private network. For example, the first performance metric corresponds to a delay of the one or more first streams transmitted using a cellular communications protocol such as 5G, which is received by the Core network (5GC or EPC) 106 from the primary access point 102 of the private network 100. The method 700 then proceeds to 714.

At 714, a second performance metric corresponding to the one or more second streams transmitted using a second communications protocol is received from the primary access point of the private network. For example, the second performance metric corresponds to a delay of the one or more second streams transmitted using a WLAN communications protocol such as WiFi, which is received by the server device 108 from the primary access point 102 of the private network 100. The method 700 then proceeds to 716.

At 716, a third performance metric corresponding to the one or more third streams transmitted using the first communications protocol is received from the primary access point of the private network. For example, the third performance metric corresponds to a delay of the one or more third streams transmitted using the cellular communications protocol such as 5G, which is received by the server device 108 from the primary access point 102 of the private network 100. The method 700 then proceeds to 718.

At 718, a fourth performance metric corresponding to the one or more fourth streams transmitted using the second communications protocol is received from the primary access point of the private network. For example, the fourth performance metric corresponds to a delay of the one or more fourth streams transmitted using the WLAN communications protocol such as WiFi, which is received by the server device 108 from the primary access point 102 of the private network 100. The method 700 then proceeds to 720.

At 720, the communication link between the primary access point and the secondary access point of the private network is reconfigured based on the first performance metric, the second performance metric, the third performance metric, and the fourth performance metric.

By way of example, the server device 108 stores a data structure (e.g., a table) that associates a plurality value of performance metric and QoS parameter(s) in association with channel parameters that preserve QoS/QCI on each control channel, such as a number of carriers on different frequencies and corresponding bandwidths for each carrier frequency, which have been obtained via network simulations. The server device 108 obtains, from the data structure, channel parameters corresponding to the first performance metric, the second performance metric, the third performance metric, the fourth performance metric, and the previously obtained QCI parameter value(s). The server device 108 then transmits message(s) to the primary access point device 102, which cause the primary access point device 102 to configure the control channel between the primary access point 102 and the secondary access point 104-1 of the private network 100 such that QoS/QCI is maintained and preserved. The method 700 then proceeds to 712. The method 700 then ends.

The various embodiments described above can be combined to provide further embodiments. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method performed by a primary access point device in a private network, the method comprising:

obtaining a first quality of service (QoS) class identifier (QCI) and a first bitrate based on one or more first stream requests received by the primary access point device or a secondary access point device, the one or more first stream requests corresponding to one or more first streams transmitted using a first communications protocol;

obtaining a second QCI and a second bitrate based on one or more second stream requests received by the primary access point device or the secondary access point device, the one or more second stream requests corresponding to one or more second streams transmitted using a second communications protocol, the second communications protocol being different from the first communications protocol;

obtaining a third QCI based on the first QCI and a first QCI margin increment;

obtaining a third bitrate based on the first bitrate and a first bitrate margin increment;

obtaining a fourth QCI based on the second QCI and a second QCI margin increment;

obtaining a fourth bitrate based on the second bitrate and a second bitrate margin increment; and transmitting the one or more first streams and the one or more second streams using a communication link between the primary access point and the secondary access point device, the communication link being configured based on the third QCI, the third bitrate, the fourth QCI, and the fourth bitrate.

2. The method according to claim 1, wherein the obtaining the second QCI includes:

obtaining QoS information based on a plurality of second stream requests corresponding to the one or more second streams transmitted using the second communication protocol; and converting the QoS information to the second QCI.

3. The method according to claim 1, wherein the first communications protocol is a cellular communications protocol, and the second communications protocol is a wireless local area network protocol.

4. The method according to claim 1, further comprising:

obtaining a fifth QCI and a fifth bitrate based on one or more third stream requests received by the primary access point device or the secondary access point device, the one or more third stream requests corresponding to one or more third streams transmitted using the first communications protocol;

obtaining a sixth QCI and a sixth bitrate based on one or more fourth stream requests received by the primary access point device or the secondary access point device, the one or more third stream requests corresponding to one or more fourth streams transmitted using the second communications protocol;

obtaining a seventh QCI based on the fifth QCI and the first QCI margin increment;

obtaining a seventh bitrate based on the fifth bitrate and the first bitrate margin increment;

obtaining an eighth QCI based on the sixth QCI and a second QCI margin increment;

obtaining an eighth bitrate based on the sixth bitrate and the second bitrate margin increment; and transmitting the one or more third streams and the one or more fourth streams using the communication link between the primary access point and the secondary access point device, the communication link being configured based on the seventh QCI, the seventh bitrate, the eighth QCI, and the eighth bitrate.

5. The method according to claim 1, wherein the obtaining the first QCI includes obtaining a first default QoS or QCI value based on contents of one of a plurality of first stream requests, or wherein the obtaining the second QCI includes obtaining a second default QoS or QCI value based on contents of one of a plurality of second stream requests.

6. The method according to claim 1, further comprising:

configuring the communication link based on the third QCI, the third bitrate, the fourth QCI, and the fourth bitrate, including transmitting a message from the primary access point device to the secondary access point device, the message indicating one or more carrier frequencies and one or more bandwidths respectively corresponding to the one or more carrier frequencies.

7. The method according to claim 1, further comprising:

configuring the communication link based on the third QCI, the third bitrate, the fourth QCI, and the fourth bitrate; and reconfiguring the communication link in response to determining that a current time corresponds to a scheduled time.

8. The method according to claim 1, wherein the obtaining the first QCI is based on a type of stream indicated by one of a plurality of first stream requests, a type of a device that transmitted one of a plurality of first stream requests, or a capability of the device that transmitted one of the plurality of first stream requests, or wherein the obtaining the second QCI is based on a type of stream indicated by one of a plurality of second stream requests, a type of a device that transmitted one of the plurality of second stream requests, or a capability of the device that transmitted one of the plurality of second stream requests.

9. The method according to claim 1, wherein the third QCI is greater than the first QCI, wherein the third bitrate is greater than the first bitrate, wherein the fourth QCI is greater than the second QCI, and wherein the fourth bitrate is greater than the second bitrate.

10. A method performed in a core network that communicates with a private network, the method comprising:

receiving, from a primary access point device of the private network, a first quality of service (QoS) parameter identifier (QCI) and a first bitrate corresponding to one or more first streams transmitted using a first communications protocol;

receiving, from the primary access point device of the private network, a second QCI and a second bitrate corresponding to one or more second streams transmitted using a second communications protocol, the second communications protocol being different from the first communications protocol;

receiving, from a secondary access point device of the private network, a third QCI and a third bitrate corresponding to one or more third streams transmitted using the first communications protocol;

receiving, from the secondary access point device of the private network, a fourth QCI and a fourth bitrate corresponding to one or more fourth streams transmitted using the second communications protocol; and configuring a communication link between the primary access point device and the secondary access point device of the private network based on the first QCI, the first bitrate, the second QCI, the second bitrate, the third QCI, the third bitrate, the fourth QCI, and the fourth bitrate.

11. The method according to claim 10, further comprising:

receiving, from the primary access point device of the private network, a first performance metric corresponding to the one or more first streams transmitted using the first communications protocol;

receiving, from the primary access point device of the private network, a second performance metric corresponding to the one or more second streams transmitted using the second communications protocol;

receiving, from the secondary access point device of the private network, a third performance metric corresponding to the one or more third streams transmitted using the first communications protocol;

receiving, from the secondary access point device of the private network, a fourth performance metric corresponding to the one or more fourth streams transmitted using the second communications protocol; and reconfiguring the communication link between the primary access point device and the secondary access point device of the private network based on the first performance metric, the second performance metric, the third performance metric, and the fourth performance metric.

12. The method according to claim 10, further comprising:

receiving, from the primary access point device of the private network, a first performance metric corresponding to the one or more first streams transmitted using the first communications protocol;

receiving, from the primary access point device of the private network, a second performance metric corresponding to the one or more second streams transmitted using the second communications protocol;

receiving, from the secondary access point device of the private network, a third performance metric corresponding to the one or more third streams transmitted using the first communications protocol;

receiving, from the secondary access point device of the private network, a fourth performance metric corresponding to the one or more fourth streams transmitted using the second communications protocol; and transmitting the first performance metric, the second performance metric, the second performance metric, the third performance metric, and the fourth performance metric.

13. The method according to claim 10, further comprising:

receiving, from a user equipment (UE) device connected to the primary access point device or the secondary access point device of the private network, a first performance metric corresponding to the one or more first streams transmitted using the first communications protocol;

receiving, from the UE device connected to the primary access point device or the secondary access point device of the private network, a second performance metric corresponding to the one or more second streams transmitted using the second communications protocol; and reconfiguring the communication link between the primary access point device and the secondary access point device of the private network based on the first performance metric and the second performance metric.

14. The method according to claim 10, further comprising:

receiving, from the primary access point device of the private network, a unique identifier of the primary access point device of the private network;

receiving, from the secondary access point device of the private network, a unique identifier of the secondary access point device of the private network;

storing a first performance parameter corresponding to the one or more first streams transmitted using the first communications protocol in association with the unique identifier of the primary access point device of the private network;

storing a second performance parameter corresponding to the one or more second streams transmitted using the first communications protocol in association with the unique identifier of the primary access point device of the private network;

storing a third performance parameter corresponding to the one or more first streams transmitted using the first communications protocol in association with the unique identifier of the secondary access point device of the private network; and storing a fourth performance parameter corresponding to the one or more second streams transmitted using the second communications protocol in association with the unique identifier of the primary access point device of the private network.

15. The method according to claim 10, further comprising:

receiving, from the primary access point device of the private network, a unique identifier of the primary access point device of the private network;

receiving, from the secondary access point device of the private network, a unique identifier of the secondary access point device of the private network;

transmitting, to the primary access point device of the private network, a request for first performance information;

receiving, from the primary access point device of the private network, the first performance information;

storing the first performance information in association with the unique identifier of the primary access point device of the private network;

transmitting, to the secondary access point device of the private network, a request for second performance information;

receiving, from the secondary access point device of the private network, the second performance information; and storing the second performance information in association with the unique identifier of the secondary access point device of the private network.

16. The method according to claim 10, further comprising:

receiving, from a user equipment (UE) device connected to the primary access point device or the secondary access point device of the private network, a unique identifier of the UE device;

storing a first performance parameter corresponding to the one or more first streams transmitted using the first communications protocol in association with the unique identifier of the UE device; and storing a second performance parameter corresponding to the one or more second streams transmitted using the first communications protocol in association with the unique identifier of the UE device.

17. The method according to claim 10, further comprising:

receiving, from a user equipment (UE) device connected to the primary access point device or the secondary access point device of the private network, a unique identifier of the UE device;

transmitting, to the UE device, a request for performance information;

receiving, from the UE device, the performance information; and storing the performance information in association with the unique identifier of the UE device.

18. The method according to claim 10, wherein the first communications protocol is a cellular communications protocol, and the second communications protocol is a wireless local area network protocol.

19. The method according to claim 10, further comprising:

receiving, from the primary access point device of the private network, a fifth QCI and a fifth bitrate corresponding to one or more fifth streams transmitted using the first communications protocol;

receiving, from the primary access point device of the private network, a sixth QCI and a sixth bitrate corresponding to one or more sixth streams transmitted using the second communications protocol;

receiving, from the secondary access point device of the private network, a seventh QCI and a seventh bitrate corresponding to one or more seventh streams transmitted using the first communications protocol;

receiving, from the secondary access point device of the private network, an eighth QCI and an eighth bitrate corresponding to one or more eighth streams transmitted using the second communications protocol; and reconfiguring the communication link between the primary access point device and the secondary access point device of the private network based on the fifth QCI, the fifth bitrate, the sixth QCI, the sixth bitrate, the seventh QCI, and the seventh bitrate.

20. The method according to claim 10, further comprising:

configuring a communication link between the secondary access point device and an access of the private network that is different from the primary access point device in response to determining that stream requirements of the primary access point device is greater than a first threshold value or in response to determining that stream requirements of the primary access point device is less than a second threshold value.

* * * * *